(12) United States Patent
Reiter

(10) Patent No.: US 7,334,541 B2
(45) Date of Patent: Feb. 26, 2008

(54) ANIMAL BEHAVIOR SHAPING DEVICE

(76) Inventor: Daniel J. Reiter, 8199 19th Ave., Eau Claire, WI (US) 54703

( * ) Notice: Subject to any disclaimer, the term of this patent is extended or adjusted under 35 U.S.C. 154(b) by 178 days.

(21) Appl. No.: 11/056,055

(22) Filed: Feb. 11, 2005

(65) Prior Publication Data

US 2006/0180092 A1    Aug. 17, 2006

(51) Int. Cl.
*A01K 37/00* (2006.01)
(52) U.S. Cl. .............................. 119/712; 119/29; 124/54
(58) Field of Classification Search ............. 119/51.01, 119/702, 707, 712, 720; 124/16, 26, 32, 124/34
See application file for complete search history.

(56) References Cited

U.S. PATENT DOCUMENTS

| | | | | |
|---|---|---|---|---|
| 2,199,009 | A * | 4/1940 | Perryman | 124/26 |
| 2,505,428 | A * | 4/1950 | Pope | 124/65 |
| 3,897,061 | A * | 7/1975 | Grattan | 473/511 |
| 4,181,911 | A | 1/1980 | Black | |
| 4,307,529 | A * | 12/1981 | White et al. | 42/105 |
| 5,299,983 | A * | 4/1994 | Pfost et al. | 473/45 |
| 5,800,288 | A * | 9/1998 | Mims | 473/417 |
| 5,839,607 | A * | 11/1998 | Swanson | 221/231 |
| 5,983,551 | A * | 11/1999 | Lalor | 42/105 |
| 6,170,439 | B1 | 1/2001 | Duncan et al. | |
| 6,571,743 | B1 * | 6/2003 | Curry | 119/720 |
| 2001/0030392 | A1 * | 10/2001 | Huang | 273/121 A |

OTHER PUBLICATIONS

A drawing from Applicant showing a prior device designed by the Applicant and disclosed to the public in approximately Nov. 2001.

Printout of Web Page describing the Remote Controlled Scent Box manufactured by K-9 Search and Detection, Inc.

A drawing from Applicant showing the Remote Controlled Scent Box manufactured by K-9 Search and Detection, Inc. as disclosed to Applicant in or about Sep. 2005.

Printout of Web Page showing the Hide-N-Seek K-9 Training System from American Aluminum Accessories, Inc. dated Mar. 14, 2005.

Printout of Web Page showing the Ray Allen Reward Box from Ray Allen Professional K-9 Equipment dated Mar. 14, 2005.

Printout of Web Page showing the Remote Reward Training System from Kraftwerk K-9 Kamp dated Mar. 14, 2005.

* cited by examiner

*Primary Examiner*—Teri Pham Luu
*Assistant Examiner*—Valentina Xavier
(74) *Attorney, Agent, or Firm*—Derek L. Prestin

(57) ABSTRACT

A device for shaping the behavior of an animal using a behavior marking and reward delivery system is provided. The compact behavior shaping device includes a battery, a trigger assembly, a receiver, a spring assembly, and a bore assembly, and is capable of storing and propelling commonly used motivational items, such as food, toys, dummies, tugs, balls, prey items, and other such objects, over a range of approximately 1 to 50 feet. The animal trainer manually compresses the spring assembly, which is then engaged by the trigger assembly. When the receiver receives a signal from a transmitter, it triggers the release of a motivational item from the device by activating the trigger assembly and/or triggers the occurrence of a marking event, such as a noise. A variety of wired and wireless transmitter devices, such as a hand-held transmitter, a motion sensor, a pressure sensor, and/or a shock sensor may be used to transmit the signal to the receiver.

16 Claims, 10 Drawing Sheets

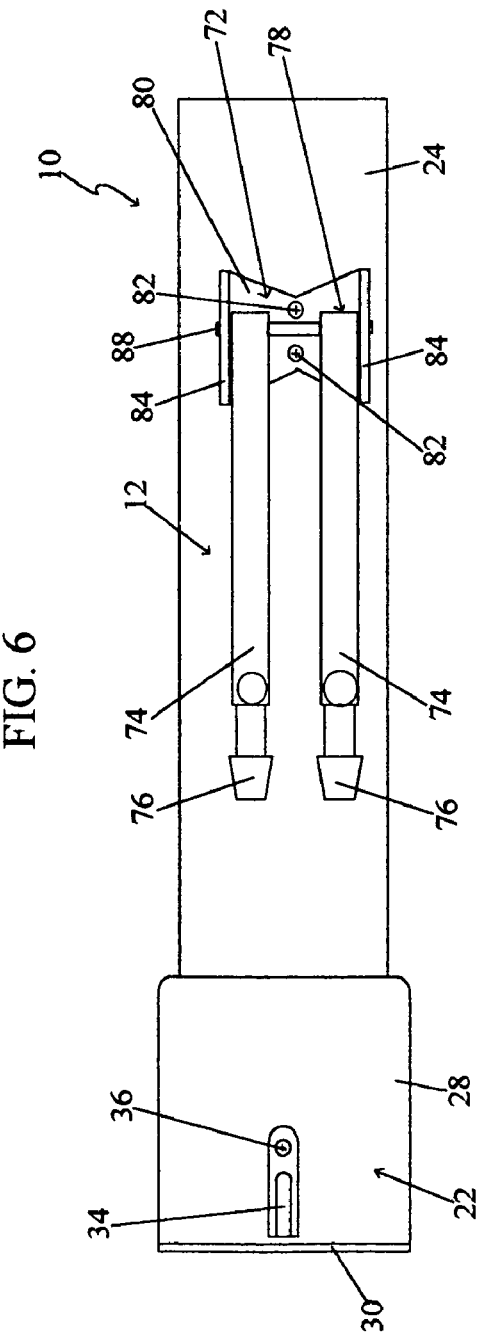
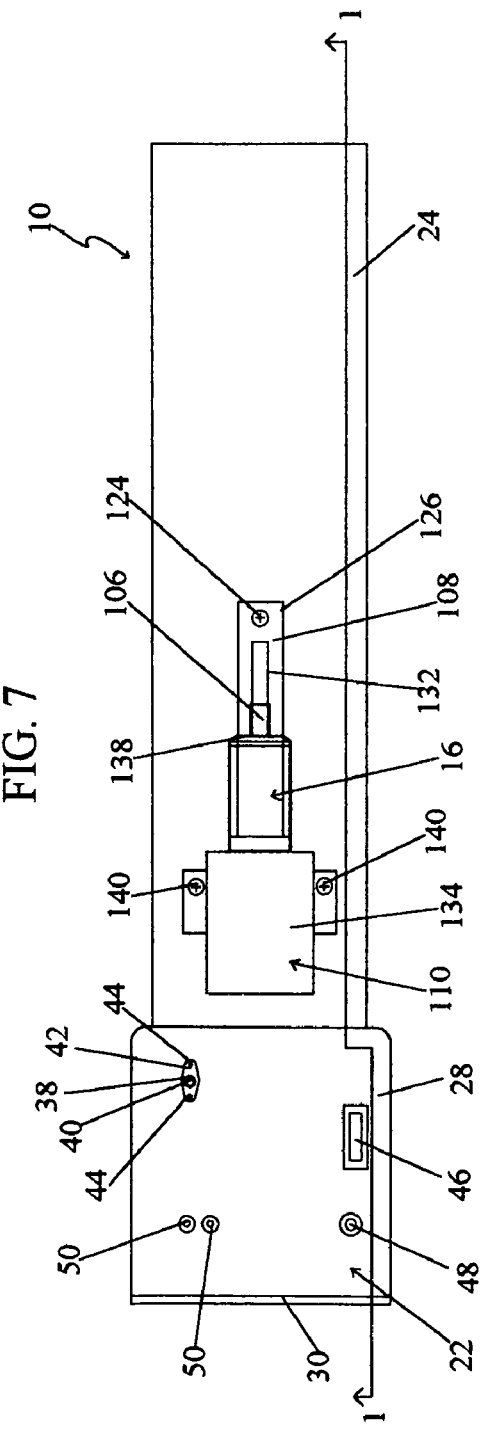

ANIMAL BEHAVIOR SHAPING DEVICE

BACKGROUND OF THE INVENTION

The present invention is directed to a device for shaping the behavior of an animal and, more particularly, to a device for shaping the behavior of an animal using a behavior marking and reward delivery system.

For much of human history, humans have trained animals, such as dogs and other domesticated and non-domesticated animals, to accomplish certain tasks for a variety of reasons. In some instances, such training was used for purposes of training the animal for hunting or competition. In other instances, such training was used to capitalize on the specific biological advantages of the animal in such a way as to benefit humans, such as the use of a dog's superior sense of smell to accomplish tasks such as search and rescue, tracking, searching for illegal drugs, and searching for explosive devices. A number of different methods have been used to train such animals.

There are two common classes of training methods. The first class of training methods uses positive reinforcement, such as providing the animal with a positive stimulus like a reward, to reinforce the desired behaviors completed by the animal. The second class of training methods utilizes negative reinforcement, such as providing the animal with a negative stimulus, generally in the form of some type of punishment, to deter the animal from exhibiting behaviors other than the desired behavior. In general, most animal training methods incorporate both positive and negative reinforcement, but under current training methods a significant amount of negative reinforcement is usually required, particularly when the animal is first beginning to learn the desired behaviors.

Conventionally, when positive reinforcement is utilized, an animal trainer will reinforce the desired behavior by providing the animal with a motivational, or reward, item when the animal accomplishes a particular desired task. In the past, animal trainers have generally been restricted in their choice of training methods by their ability to see the behavior being trained and ability to mark and/or reward the desired behavior through the use of a hand-held "clicker," verbal voice cue, or other similar noise-making device and/or motivational items. Typically, the animal's reward for completing the proper behavior has been in the form of a motivational item or training object that is hand-delivered to, thrown to, or pre-placed for the animal. Motivational items and training objects include any item which, through instinctual or other reasons, the animal desires to receive. Examples of common motivational items and training objects include food, toys, dummies, tugs, balls, prey items, and other similar objects. The delivery of such motivational items has been limited by the animal trainer's ability to directly observe the specific behaviors of the animal and by the trainer's ability to mark and deliver the animal's reward in a timely fashion, which may be difficult when the animal is being trained in enclosed areas where it is difficult for the trainer to see or when there is a large distance between the animal and the trainer. That is, the trainer's choice in training methods has been limited when the training occurs over a large distance, in a container or other structure, or behind cover.

Attempts have been made to overcome some of these limitations on the trainer's training methods through the use of mechanical devices to, for example, deliver the reward to the animal such as by dropping the reward via gravity in place of the trainer. Such devices that are conventionally available have been restricted to a particular reward type, such as a specially designed ball specific to the particular device or a round ball in general. These prior art devices could not deliver food rewards, nor could they use any tug items, such as a jute roll with strap, a kong on a rope, or a rubber ball with rope. The use and acceptance of these conventional prior art mechanical training devices have been hampered by these limitations, particularly given such devices cannot be used with the most popular motivational items utilized in animal training, and specifically those used in both agility and protection dog training. Examples of such prior art mechanical training devices are provided by U.S. Pat. Nos. 6,571,743 and 4,307,529.

Conventional prior art mechanical training devices have also been incapable of delivering a reward with sufficient speed and distance to take advantage of or initiate an animal's "prey drive." That is, such devices have been unable to propel the motivational item with enough speed and distance to engage the animal's instinctual imperative to chase down and capture prey. Rather, these prior art mechanical training devices typically would be hung above or placed on the ground and the motivational item (a ball) would roll out of the device via gravity and merely fall to the ground.

In some cases, most particularly if the device was to be used for propelling dummies to retriever animals, such as retriever dogs, the delivery of the dummies has been powered by an additional propellant, such as a "blank" filled with gunpowder. However, the use of such devices has often been undesirable in many circumstances, due to the creation of loud undesired noise which could interfere with the behavior marking noise and/or disturb the trainer's neighbors. Additionally, such devices generally cannot be used indoors due to the noise created by the "blank" and the distance which the dummy is thrown by the device.

Finally, prior art devices have done little to present a solution to the problem of the trainer being required to directly observe the behavior of the animal before releasing the reward. Therefore, such devices have still been limited by placement of the device and location of the trainer, even when hand-held transmitters have been used, such that the trainer was still required to directly observe the behavior of the animal and to release the reward at exactly the right time to be effective. Therefore, such prior art devices have generally been no more effective than a commonly-used handheld clicker. Additionally, the use of a hand-held transmitter as the only method of triggering the release of the reward diminishes the effectiveness of the devices where the devices were used over large distances, in containers or other structures, or behind cover, as the strength of the signal and the range of the transmitter is greatly reduced in such cases.

Thus, there is an unmet need for an animal behavior shaping system designed for the positive reinforcement of the animal's behavior by the trainer that can deliver a wide variety of rewards, provide a consistent way to accurately mark and reward the behavior of the animal, provide a compact single system platform device that is capable of multiple methods of training, shorten animal training time and expand the potential of training with positive stimulus while reducing the need for negative stimulus during training, and readily accepts new technologies.

BRIEF SUMMARY OF THE INVENTION

The present invention is directed to a device for shaping the behavior of an animal and, more particularly, to a device for shaping the behavior of an animal to perform different desired tasks using a behavior marking and reward delivery system. Examples of desired tasks that may be shaped using the present invention include, but are not limited to, an agility dog learning to touch its paws to a particular spot, a police or military detection dog learning to work at a distance away from a handler or inside a building by itself, a drug or bomb sniffing dog learning to find drugs or explosives hidden within containers, packages, or luggage, a search and rescue dog learning to safely move through dangerous or uneven terrain while searching for survivors, a retriever dog learning to scent through a field and flush prey, or training of non-domesticated animals to do a desired behavior. The applicant wishes to note that although the present invention may in some instances be discussed in connection with the training of dogs, the present invention may be used to shape the behavior of any animal with which positive reinforcement is an effective training strategy.

The present invention includes a device capable of marking a behavior and delivering or withholding a variety of currently used motivational items, such as, but not limited to, food, toys, dummies, tugs, balls, prey items, and other similar objects. The release of the motivational item may be triggered solely by the animal's behavior, through the use of a variety of wired and/or wireless sensors that transmit a signal to the device, or may be released on command by the trainer with a handheld wireless transmitter. The device may also be equipped with electrical jacks or connections that allow accessories, such as additional or substitute receivers, a game caller, a clicker solenoid for those who clicker train animals, or a non-transmitter equipped sensor such as a motion sensor to be connected to the apparatus.

Accordingly, it is an object of the present invention to provide an animal behavior shaping system that is capable of delivering a wide variety of current and future motivational items with enough speed and distance to excite the prey drive response in the animal.

It is another object of the present invention to provide for improved training by accurately marking and rewarding animal behavior with increased speed and efficiency by removing the burden or directly observing the animal and directly providing the reward from the trainer.

It is a further object of the present invention to provide a compact system platform device which may be capable of use in connection with multiple training methods, which is flexible for the trainer, and is capable of multiple tasks, by allowing the addition of accessories or subsystems directly to the device or by wired or wireless means.

Yet another object of the present invention is to shorten time required to train an animal and to expand potential of training with positive stimulus techniques, while reducing the need for negative stimulus during training.

Finally, it is another object of the present invention to allow the animal behavior shaping device to be produced or manufactured from inexpensive and readily-available components.

BRIEF DESCRIPTION OF THE DRAWINGS

FIG. 6 is a bottom plan view of the animal behavior shaping device of FIG. 1;

FIG. 7 is a top plan view of the animal behavior shaping device of FIG. 1;

DETAILED DESCRIPTION OF THE PREFERRED EMBODIMENT(S)

Figure 1:
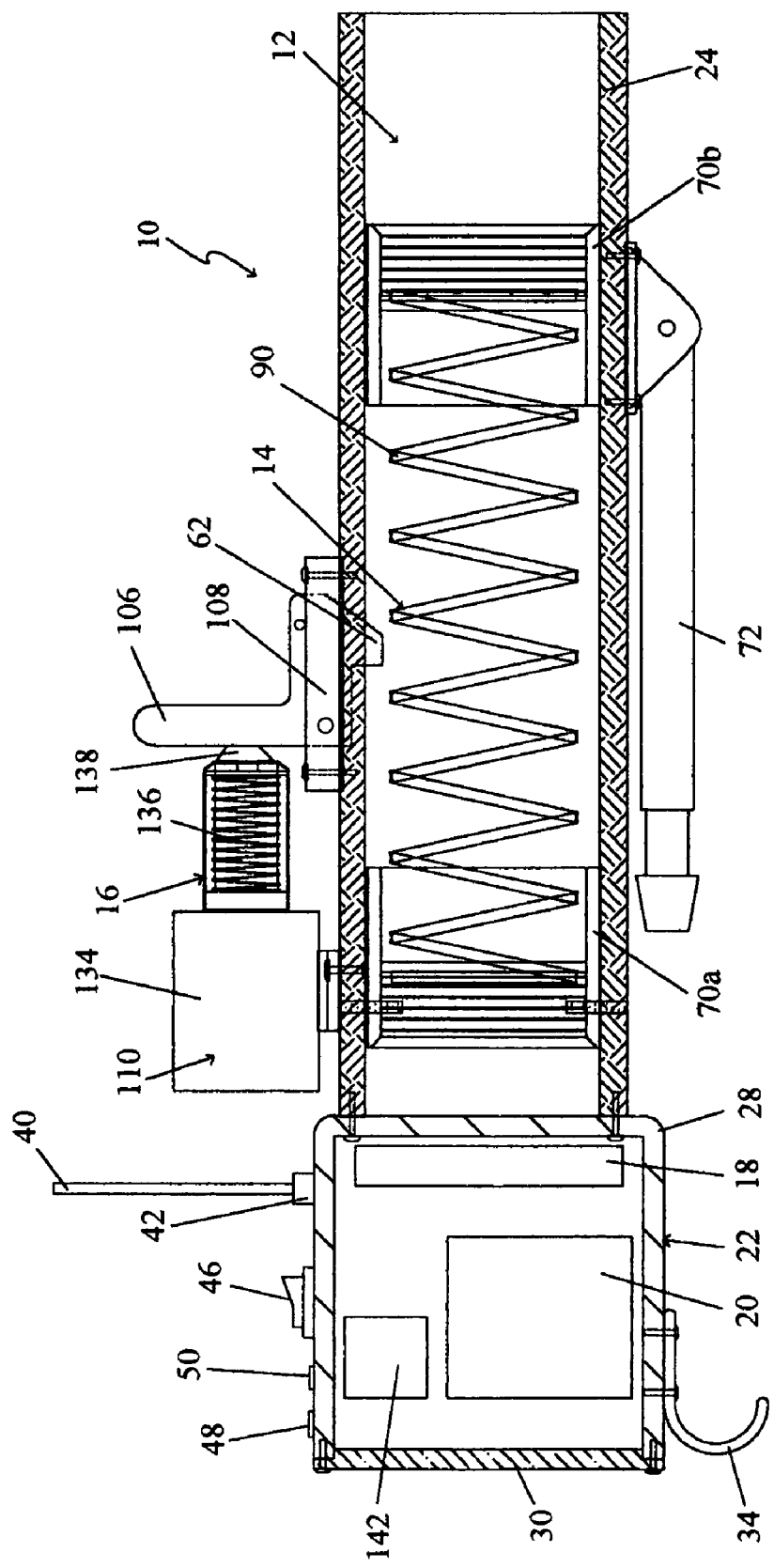
FIG. 1 is a sectional view of an animal behavior shaping device embodying features of the present invention as viewed along line 1-1 of FIG. 7.

Referring to FIGS. 1-11, an animal behavior shaping device 10 having features of the present invention is shown. The animal behavior shaping device 10 includes a bore assembly 12, a spring assembly 14, a trigger assembly 16, a receiver 18, and a battery 20.

Figure 2:
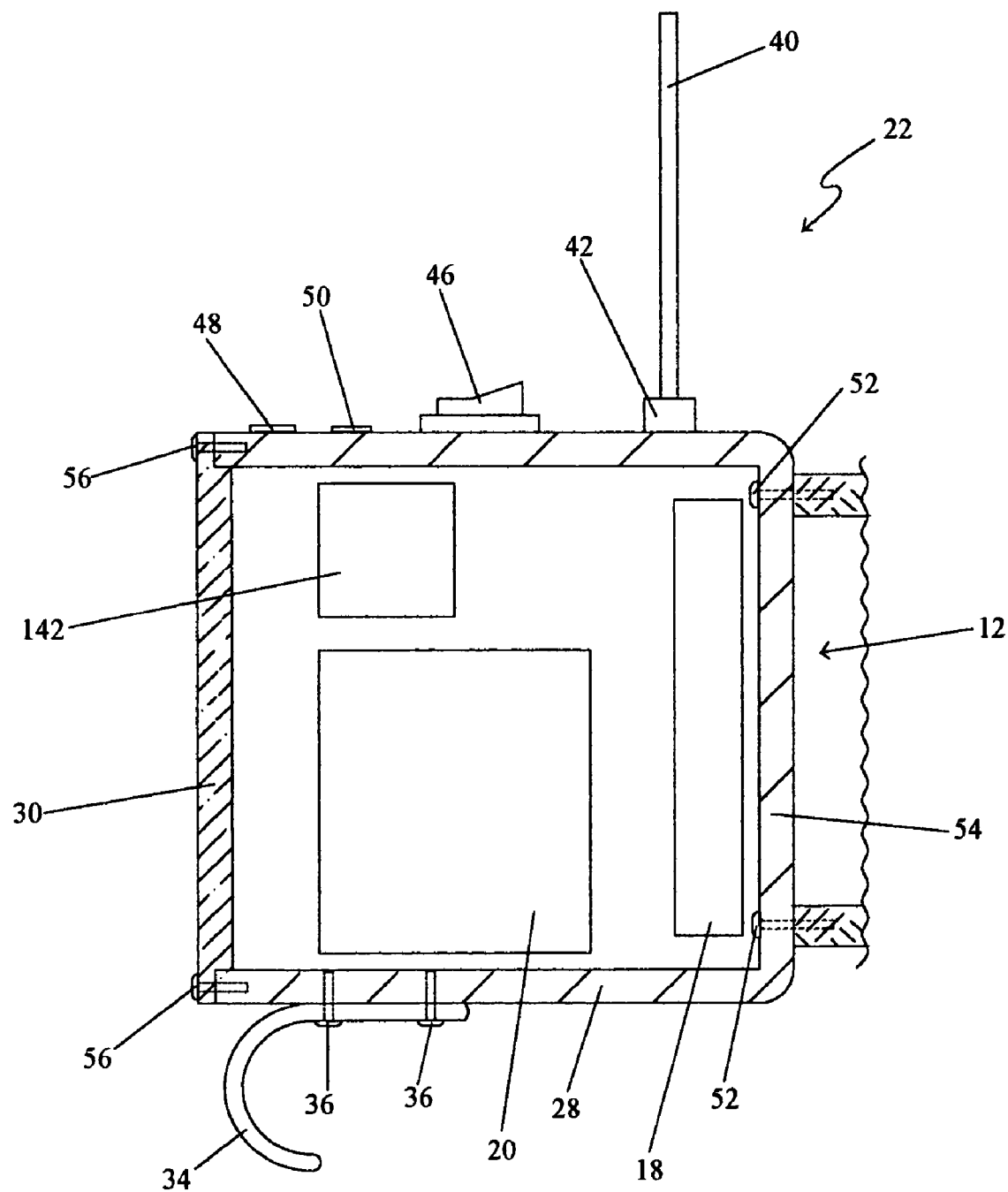
FIG. 2 is an enlarged partial sectional view of the animal behavior shaping device of FIG. 1 showing the housing of the bore assembly as viewed along line 1-1 of FIG. 7.
Figure 3:
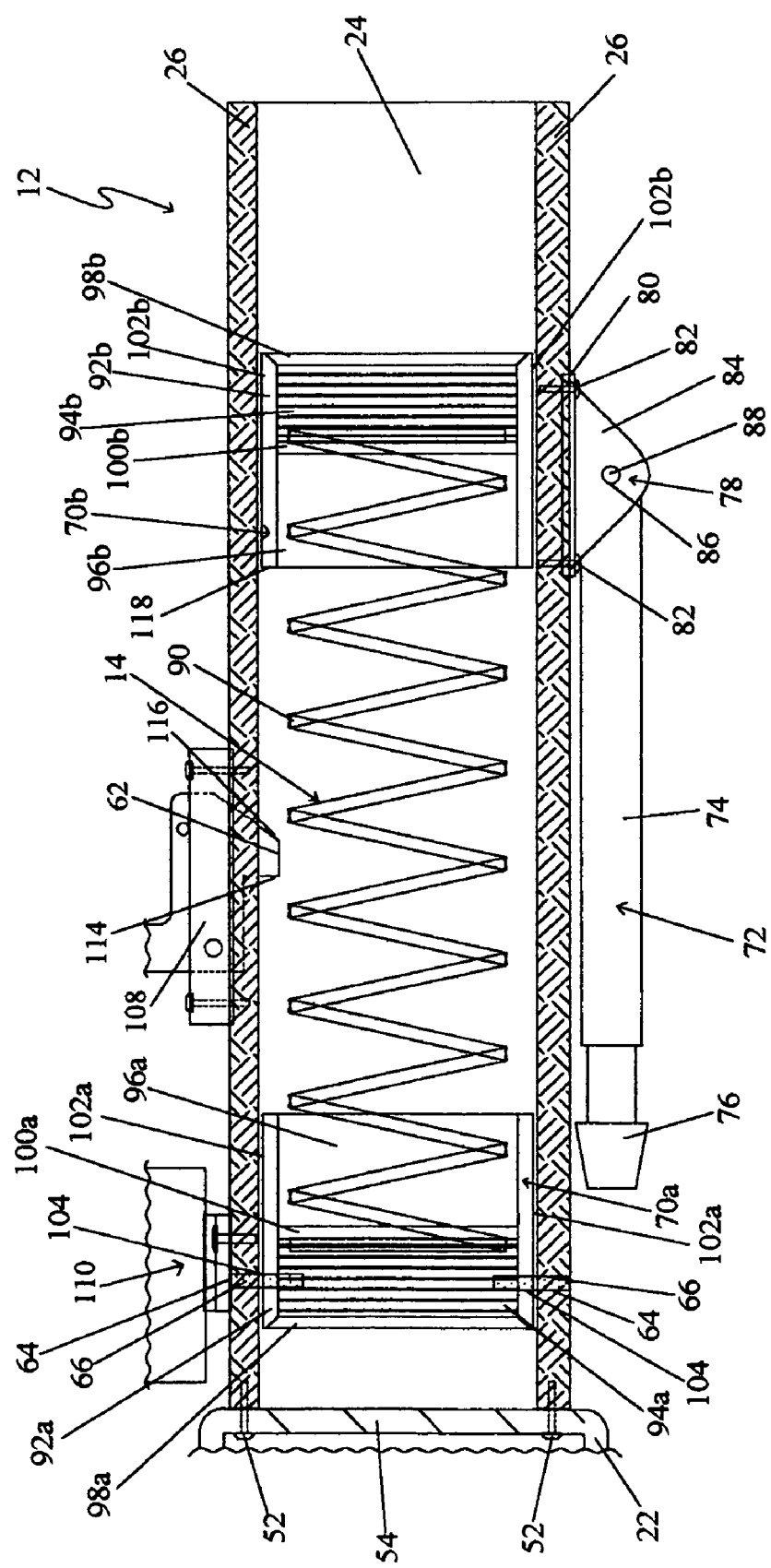
FIG. 3 is an enlarged partial sectional view of the animal behavior shaping device of FIG. 1 showing the elongated tube and spring assembly as viewed along line 1-1 of FIG. 7.

The bore assembly 12 includes a housing 22, as best illustrated in FIG. 2, and an elongated tube 24, as best illustrated in FIG. 3, wherein the elongated tube 24 includes a wall 26 having a length that is greater than the diameter of the elongated tube 24. The housing 22 of the bore assembly 12 is generally rectangular or square in shape, such that the battery 20, receiver 18, and other internal components of the animal behavior shaping device 10 may be held therein without interfering with the operation of the spring assembly 14. The housing 22 of the bore assembly 12 generally includes a body portion 28 and a cover plate 30. However, the housing 22 may alternatively take any other configuration known in the art.

Preferably, the body portion 28 of the housing 22 substantially surrounds the receiver 18, the battery 20, and other internal components of the animal behavior shaping device 10. For example, the body portion 28 may have a substantially cubic shape wherein the body portion 28 includes five sides of the cube and the sixth side of the cube is formed by the cover plate 30. However, other shapes and configurations may be used for the body portion 28 without departing from the scope of the present invention.

One or more of the sides of the body portion 28 preferably include at least one attachment point or, more preferably, at least two attachment points 32 for attaching accessories or other external components to the housing 22 and thereby to the animal behavior shaping device 10. The attachment points 32 may be any type of design which allows accessories or other equipment to be secured to the animal behavior shaping device 10. Preferably, the attachment points 32 are in the form of threaded metal inserts which are secured within apertures in the housing 22, such that accessories and the like may be attached to the bore assembly 12 using thumbscrews or other similar connectors. However, other types of attachment points, such as threaded holes without inserts, clips, connectors, and the like, may be used in connection with the present invention. The attachment points 32 have a configuration that corresponds to the configuration of the corresponding attachment points on an accessory or external component which is to be attached thereto. The body portion 28 may include additional attachment points, if such attachment points are desired to supply additional points of attachment for accessories and the like.

The body portion 28 also may include a hook 34 or other similar structure for allowing the animal behavior shaping device 10 to be hung from an elevated structure and which also raises the housing 22 off of the ground when the animal behavior shaping device 10 is resting on the ground, thereby reducing the chances that dirt, sand, leaves, or other debris will penetrate into the interior of the housing 22 and/or elongated tube 24. The hook 34 generally has a roughly semi-circular shape and is connected to the body portion 28 with at least one connector or, more preferably, at least two connectors 36. Any connector known in the art, such as screws, may be used to attach the hook 34 to the body portion 28. Additionally, the hook 34 may take any configuration which allows the animal behavior shaping device 10 to be hung from an elevated structure. The hook 34 is preferably made from a high-strength material, such as metal, which resists deformation and breakage and has sufficient strength to support the weight of the animal behavior shaping device 10.

The body portion 28 also includes at least one aperture 38, or, if necessary, two or more apertures, which allows at least one antenna 40 of the receiver 18 to pass through the housing 22 and extend therefrom to increase the sensitivity of the receiver 18. The aperture 38 has a diameter which is preferably slightly greater than the diameter of the antenna 40, such that the antenna 40 may be inserted therethrough with ease. In such a case, the antenna aperture 38 may be provided with a protective cover 42, which may be made from any material which sufficiently seals the antenna aperture 38 after the antenna 40 is inserted therethrough. For example, the protective cover 42 may be constructed of plastic, rubber, or some other similar material. The protective cover 42 may be attached to the body portion 28 with connectors, such as screws 44, or adhesives.

The body portion 28 also includes an on/off switch 46 for turning the animal behavior shaping device 10 on and off.

The on/off switch 46 may take any form of a switch, such as a rocker switch (as illustrated), a sliding switch, a rotating switch, or a button.

Preferably, the body portion 28 includes at least one connector for receiving power, signal, and other connectors from accessories or other equipment. More preferably, the body portion 28 includes a power connector 48 and at least two accessory signal connectors 50. Preferably, the power connector 48 is larger in size than the signal connectors 50, such that a trainer may easily determine which connector 48, 50 is the correct connector for a power or signal output connector coming from an accessory or other equipment. The power connector 48 also allows a power source to be attached to the animal behavior shaping device 10 to power the device 10, to recharge the battery 20, or to power accessories being used therewith.

The signal connectors 50 allow the animal behavior shaping device 10 to receive a signal from an accessory and/or allow the receiver 18 to send a signal to an accessory. Preferably, one of the signal connectors 50 is configured to receive a signal from an accessory and to cause the animal behavior shaping device 10 to release the motivational item 68 when a signal is sent therethrough by the accessory, while the second signal connector 50 is configured to transmit a signal from the animal behavior shaping device 10 to the accessory when the receiver 18 receives a signal from a transmitter, such as a handheld transmitter 210. The second signal connector 50 may be configured to send either a momentary or constant signal, or any other desired signal, from the animal behavior shaping device 10 to the accessory according to the type of signal which is desired. Such a signal may cause the accessory to be triggered or to otherwise operate, or may cause the accessory to take any other desired action or complete any other desired operation. For example, where the accessory is a marking accessory 410, the second signal connector 50 may be configured to send a momentary 12 volt electrical signal to the marking accessory 410 when the receiver 18 receives a signal from the handheld transmitter 210 or a different accessory, such that a clicker solenoid 412 or other noise-producing component of the marking accessory 410 is triggered when such a signal is received. While one preferred configuration for the signal connectors 50 is discussed herein, it will be evident to one skilled in the art that the signal connectors 50 may be configured in a number of different ways in accordance with the accessory or accessories which are to be used with the animal behavior shaping device 10 without departing from the scope of the present invention.

The configuration of the connectors 48, 50 may be any design generally known in the art that allows the secure connection of accessories or other equipment to the animal behavior shaping device 10, while allowing such connectors to be removed from the connectors 48, 50 when the accessories or other equipment are not in use. Preferably, the connectors 48, 50 are designed for use with DC power jack-type connectors, mono phone jack-type connectors, and/or other similar connectors. For example, the power connector 48 may be in the form of a female Size M DC power jack connector that is designed to accept a male Size M DC power jack connector, while the signal connectors 50 may be female ⅛" mono phone jack connectors designed to accept male ⅛" mono phone jack connectors.

Optionally, the body portion 28 may include at least one (for a one channel receiver) or at least two (for a two channel receiver) light emitting diodes (LED's), which show the current status of the channel or channels of the receiver 18, such that the LED's show whether the animal behavior device 10 has been triggered and must be reset or if it has been placed in its "safe" mode by the trainer. The body portion 28 may also optionally include another LED or light which indicates whether the animal behavior shaping device 10 has been turned on.

The body portion 28 of the housing 22 preferably includes vents for allowing the exchange of air between the interior of the housing 22 and the environment. The vents may take any form known in the art, such as apertures, holes, or slots, and may be located anywhere on the body portion. Preferably, the vents are in the form of apertures, which include small plastic or rubber inserts with screens inserted therein, that are located on the top and bottom walls of the body portion 28. The use of such inserts prevents the entry of dirt, sand, and other debris through the vents and into the interior of the housing 22. While the use of separate vents is preferred, the vents may optionally be omitted or may be incorporated in other structures of the housing 22, such as the cover plate 30.

While the on/off switch 46, power and signal connectors 48, 50, and optional lights have been discussed herein in connection with the body portion 28 of the housing 22, it will be evident to one skilled in the art that these components may alternatively be included as part of the cover plate 30 of the housing 22 or the elongated tube 24 of the bore assembly 12 without departing from the scope of the present invention.

The body portion 28 attaches to the elongated tube 24 using screws 52, or any other desired type of connector, that pass through one of the walls 54 of the body portion 28 and into the wall 26 of the elongated tube 24. Any number of screws or connectors that sufficiently secure the body portion 28 to the elongated tube 24 may be used. For example, in one embodiment of the present invention, four (4) screws are used to attach the body portion 28 to the elongated tube 24. Preferably, the body portion 28 attaches to the elongated tube 24 opposite the cover plate 30.

The cover plate 30 of the housing 22 may take any form which corresponds with the general shape of the body portion 28, such that the cover plate 30 may be used to completely enclose the receiver 18, the battery 20, and other internal components of the animal behavior shaping device 10 within the housing 22 of the bore assembly 12. For example, where the body portion 28 is roughly cubic in shape, the cover plate 30 is roughly square in shape, with dimensions that are the same as those of the sides of the body portion 28.

Figure 9:
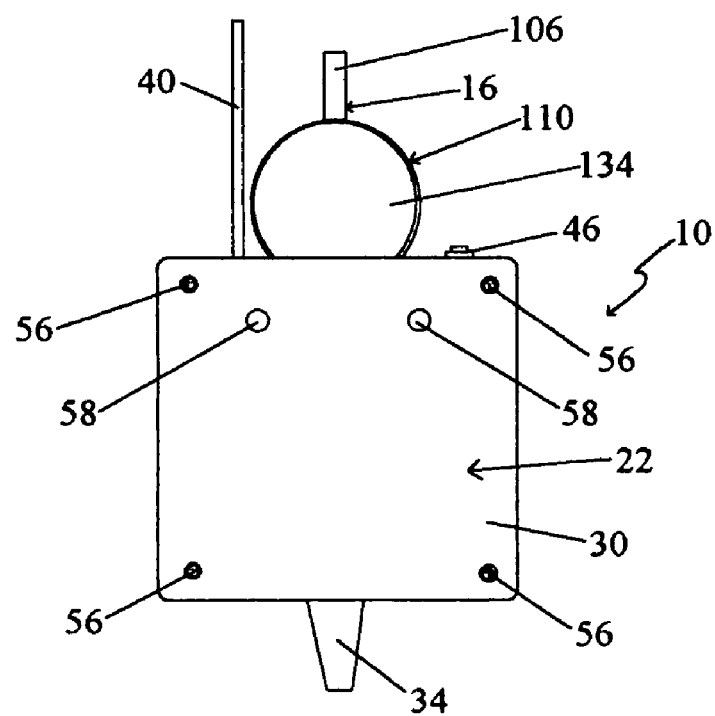
FIG. 9 is an elevational view of the animal behavior shaping device of FIG. 1 as viewed from the cover plate of the housing.

The cover plate 30 may be attached to the body portion 28 using screws 56 or other similar connectors. Preferably, four (4) screws 56 are used to attach the cover plate 30 to the body portion 28, as best illustrated in FIG. 9. However, the cover plate 30 may alternatively be attached to the body portion 28 in any other way known in the art and, if connectors are utilized, may be attached to the body portion 28 using any number of connectors which is sufficient to secure the cover plate 30 to the body portion 28.

The cover plate 30 preferably includes attachment points 58 for attaching accessories or other external components to the cover plate 30 of the housing 22. The attachment points 58 have a configuration that corresponds to the configuration of the corresponding attachment points on the accessory or external component which is to be attached thereto. For example, in one embodiment of the present invention the attachment points 58 are configured as a pair of threaded inserts. Preferably, the attachment points 58 of the cover plate 30 have the same configuration as the attachment points 32 of the body portion 28, if the body portion 28 includes such attachment points.

The housing 22 is preferably constructed of poly-vinyl chloride (PVC) or another similar type of plastic, but may also be made of a variety of other similar materials. The housing 22 has dimensions that are selected such that the battery 20 and receiver 18, as well as other internal components of the animal behavior shaping device 10, may be held therein. For example, the housing 22 may have a length of approximately 4.0 inches and a width and depth of approximately 4.0 inches. Likewise, the thickness of the sides of the housing 22 are preferably selected to correspond with the thickness of the wall 26 of the elongated tube 24. For example, the sides of the housing 22 may have a thickness of approximately 0.3 inches. However, it will be apparent to one skilled in the art that different housings having various dimensions may be used in connection with the present invention according to the type and size of the battery 20, receiver 18, and other internal components used therewith.

The elongated tube 24 preferably has a substantially circular cross-section to ease the manufacture and transport of the animal behavior shaping device 10. However, alternatively the elongated tube 24 may have a cross-section having a different shape, such as elliptical, oval, square, or rectangular. The elongated tube 24 may be constructed from a variety of materials, such as plastic, metal, fiberglass, or other suitable material, but preferably the elongated tube 24 is constructed from commercially available PVC tubing or conduit. For example, the elongated tube 24 may be constructed of Schedule 80 Conduit, wherein the elongated tube 24 has an outer diameter of approximately 3.5 inches, an inner diameter of approximately 2.9 inches, and a wall thickness of approximately 0.3 inches. However, it will be apparent to one skilled in the art that elongated tubes having various lengths may be used in connection with the present invention according to the type and size the spring assembly and motivational items used therewith.

Figure 5:
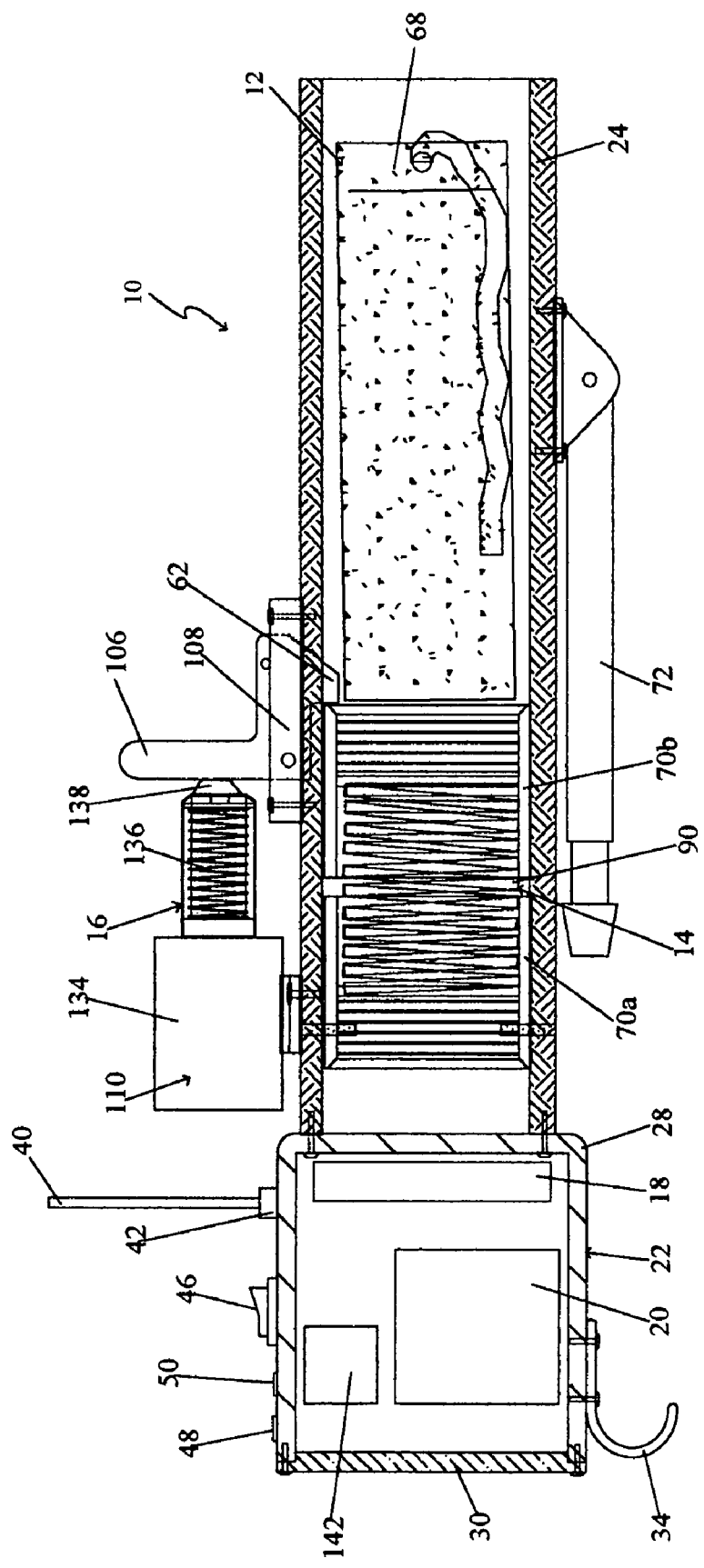
FIG. 5 is a sectional view of the animal behavior shaping device of FIG. 1 showing the spring assembly in its compressed configuration and the motivational item being held therein as viewed along line 1-1 of FIG. 7.
Figure 8:
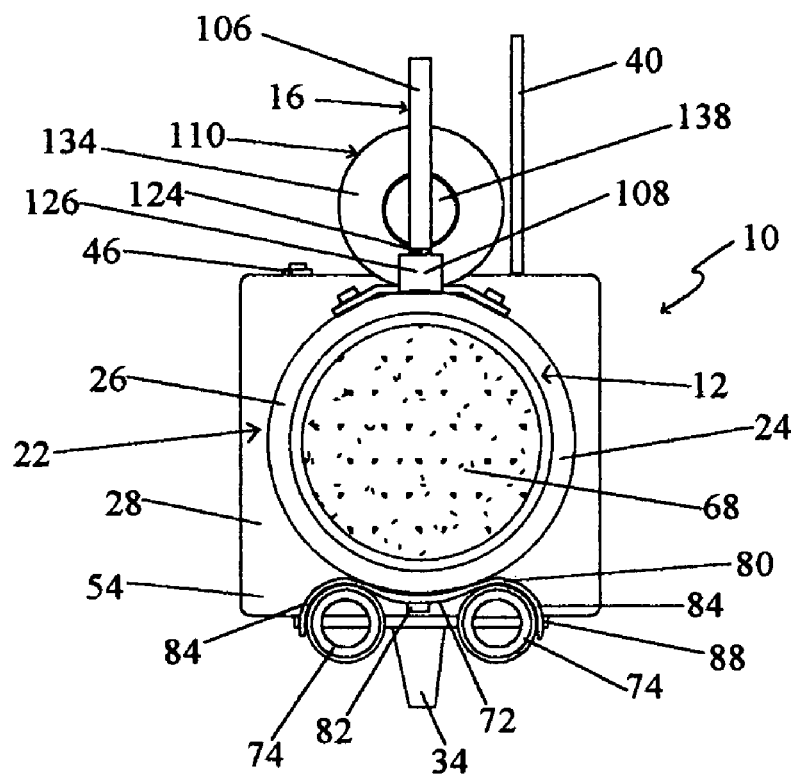
FIG. 8 is an elevational view of the animal behavior shaping device of FIG. 1 as viewed from the end of the elongated tube.
Figure 10:
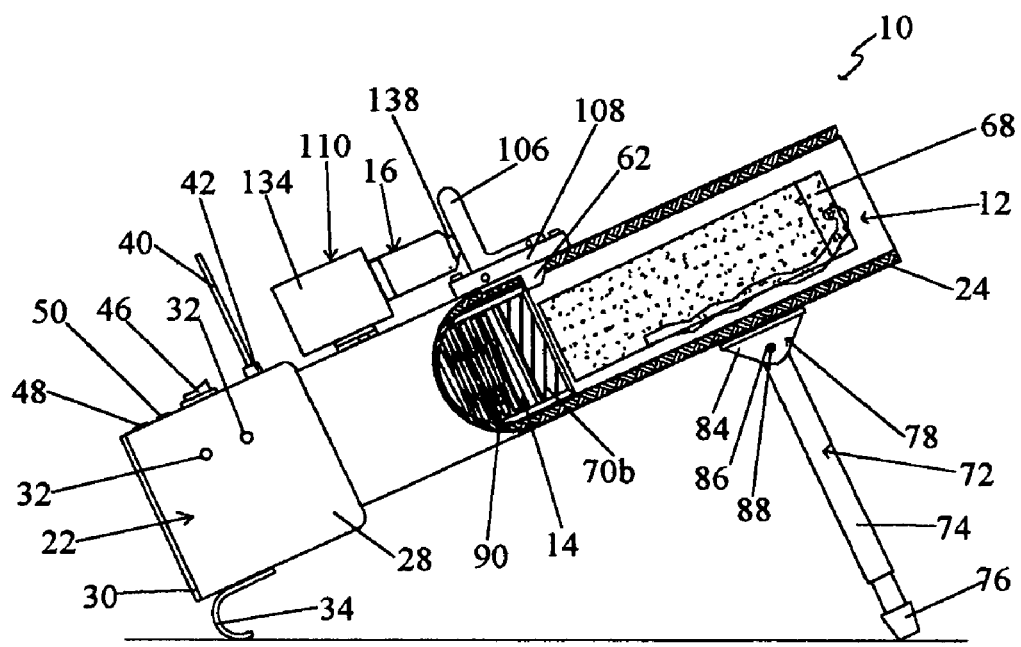
FIG. 10 is a partial sectional view of the animal behavior shaping device of FIG. 1 showing the spring assembly in its compressed configuration, the motivational item being held therein, and the bipod extending therefrom as viewed along line 1-1 of FIG. 7.
Figure 11:
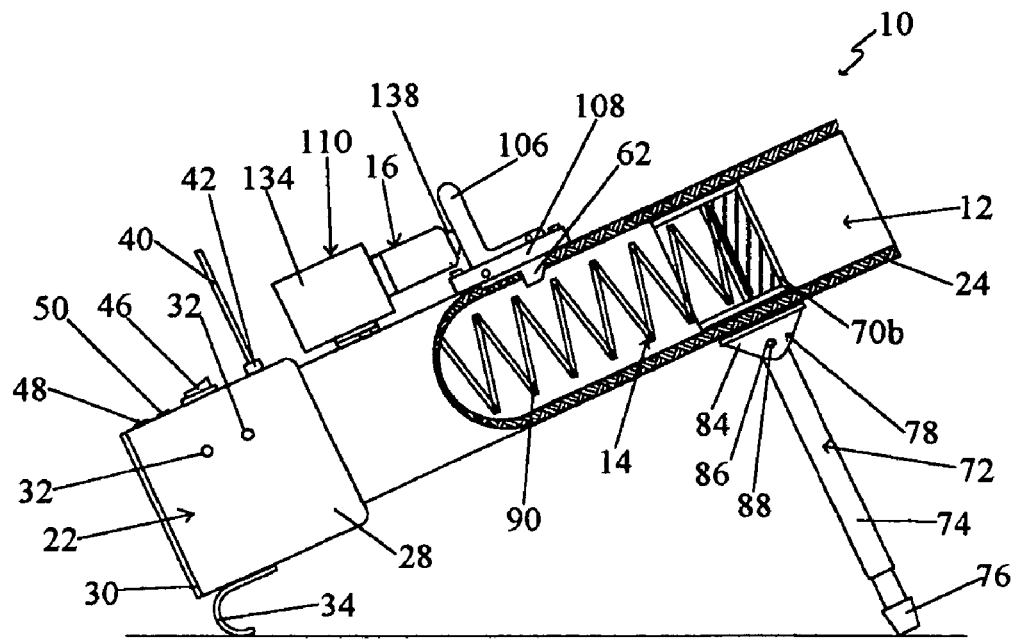
FIG. 11 is a partial sectional view of the animal behavior shaping device of FIG. 1 showing the spring assembly in its uncompressed configuration and the bipod extending therefrom as viewed along line 1-1 of FIG. 7.

The length of the elongated tube 24 is selected such that the spring assembly 14 may be held fully therein when the spring assembly 14 is in its uncompressed state, as illustrated in FIGS. 1 and 11. Additionally, the length of the elongated tube 24 is such that a variety of commonly used motivational items, such as food, toys, dummies, tugs, balls, prey items, and other such objects, may be held substantially therein when the spring assembly 14 is in its compressed state, as illustrated in FIGS. 5 and 10. For example, in one embodiment of the present invention, the elongated tube 24 may have a length of approximately 14 inches when used in conjunction with a spring assembly 14 having an uncompressed length of approximately 8.5 inches and a compressed length of approximately 2.5 inches.

Alternatively, the housing 22 of the bore assembly 12 may be omitted and the elongated tube 24 may be lengthened and designed to hold the battery 20, the receiver 18, and other internal components of the animal behavior shaping device 10. For example, in such a case the elongated tube 24 may have a length of approximately 18.0 inches when used in conjunction with a spring assembly 14 having an uncompressed length of approximately 8.5 inches and a compressed length of approximately 2.5 inches.

The thickness of the wall 26 of the elongated tube 24 is such that the elongated tube 24 has sufficient strength to resist any substantial deformation as the spring assembly 14 is compressed therein to shift the spring assembly 14 from its uncompressed state, as shown in FIGS. 1 and 11, to its compressed state, as shown in FIGS. 5 and 10. For example, where commercially available Schedule 80 Conduit tubing is used as the elongated tube 24, the wall 26 of the elongated tube 24 generally has a thickness of approximately 0.3 inches.

The elongated tube 24 defines an aperture 60 for receiving a trigger latch 62 of the trigger assembly 16, as well as at least one aperture 64 for receiving at least one pin 66, or other similar structure, for securing the spring assembly 14 to the bore assembly 12. The trigger latch aperture 60 has a shape that corresponds with the shape of the trigger latch 62, such that the trigger latch 62 may be received therein without the edges of the aperture 60 interfering with the movement of the trigger latch 62. For example, the trigger latch aperture 60 may be roughly rectangular in shape.

Likewise, the aperture 64 for the pin 66 has a shape that corresponds with the cross-sectional shape of the pin 66. Preferably, the aperture 64 is circular in shape and the pin 66 has a circular cross-section. For example, in one embodiment of the present invention, the pin 66 has a circular diameter of about 0.25 inches and a length of about 1.0 inches. More preferably, the elongated tube 24 includes at least two apertures 64 for receiving at least two pins 66. Alternatively, the elongated tube 24 may define at least two apertures and there may be one long pin that extends from one aperture, through the spring assembly 14, and is received by the second aperture. While it is preferred that pins 66 or some other similar connectors, such as nails, inserts, screws, thumbscrews, and bolts, be used to secure the spring assembly 14 within the elongated tube 24, the pins 66 and the apertures 64 may be omitted if the spring assembly 14 is secured to the elongated tube 24 in some other way, such as with adhesives or by threading the spring assembly 14 into a threaded bore within the bore assembly 12.

Optionally, the elongated tube 24 may include a second set of apertures for receiving the pins 66 which are located between the apertures 64 and the housing 22 of the bore assembly 12, such that the position of the spring assembly 14 may be adjusted by removing the pins 66 from the apertures 64, shifting the spring assembly 14 toward the housing 22, and inserting the pins 66 through the second set of apertures. The presence of a second set of apertures allows the amount of compression of the spring assembly 14 when the spring assembly is in its compressed position to be adjusted, thereby adjusting the distance over which a motivational item 68 will be propelled by the animal behavior shaping device 10. That is, the trigger latch 62 still engages then end cap 70b of the spring assembly 14 when the spring assembly 14 is secured by the pins 66 inserted through the second set of apertures, but the spring assembly 14 is compressed a shorter distance than the spring assembly 14 is when the first set of apertures 64 is used to secure the spring assembly 14. Therefore, when the second set of apertures are used to secure the spring assembly 14 within the elongated tube 24, the spring assembly 14 stores less energy in its compressed state and propels the motivational item 68 over a smaller distance when the spring assembly 14 is released by the trigger latch 62. Likewise, the elongated tube 24 may optionally include any number of sets of apertures, such that the spring assembly 14 may be secured within the elongated tube 24 in a plurality of positions.

The bore assembly 12 preferably also includes a support, or other similar mechanism, for allowing the animal behavior shaping device 10 to be oriented at a predetermined angle relative to the surface on which the animal behavior shaping device 10 is located. The device 10 may be oriented at any predetermined angle, from horizontal to vertical, relative to the surface on which the device 10 has been placed. Where the device 10 is to be oriented vertically relative to the surface on which the device 10 is located, the separate support may be omitted, as the housing 22 of the device 10 functions as the support under such circumstances. More preferably, the mechanism is in the form of an adjustable bipod 72, similar to those used with rifles or high-powered optical devices. The bipod 72 includes a pair of legs 74, each of which include feet 76. The adjustable bipod 72 is attached to the bore assembly 12 with a pivot assembly 78 that allows the bipod 72 to be folded back against the wall 26 of and parallel to the longitudinal axis of the elongated tube 24 when the bipod 72 is not in use or the animal behavior shaping device 10 is being transported. The pivot assembly 78 is roughly "U"-shaped, with a base plate 80 which attaches to the bore assembly 12 with connectors, such as screws 82, and two wall plates 84 that extend therefrom. The wall plates 84 define a pair of apertures 86 for receiving a pivot pin 88, which secures the bipod 72 to the base plate 80 while allowing the bipod 72 to be rotated relative to the bore assembly 12. Preferably, the legs 74 of the bipod 72 may be adjusted in length, such that the angle at which the bore assembly 12 is inclined may be varied. For example, the legs 74 of the bipod 72 may be of the telescoping variety that include small thumbscrews or other devices which may be loosened to allow the length of the legs 74 to be changed and tightened to hold the legs 74 at the desired length. In one embodiment of the present invention, the legs 74 may be adjusted to have an overall length of between eight (8) inches and twelve (12) inches. The feet 76 of the legs 74 preferably are made from rubber, but may also be made from other materials or may be omitted entirely.

While an adjustable bipod 72 is described herein as one mechanism for allowing the animal behavior shaping device 10 to be oriented at an predetermined angle, it will be clear to those skilled in the art that various other mechanisms, such as a non-adjustable bipod, a "T"-shaped structure, or even an angled structure designed to cradle the bore assembly 12 therein, may be used in connection with the present invention without departing from the scope thereof.

Optionally, the bore assembly 12 may include a mechanism for removably holding a device, such as a ram, which may be used to shift the spring assembly 14 from its uncompressed configuration to its compressed configuration. Any stiff device may be used as the ram, such a rod, stick, or other similar components, but the ram is preferably in the form of a segment of PVC pipe or conduit having a diameter which is significantly smaller than that of the elongated tube 24. In such a case, the bore assembly 12 may include a pair of "snap-in" connectors that are sized to allow the PVC pipe to be snapped into the connectors and held thereby, a pair of circular apertures which allow the PVC pipe to be received and held therein, or any other type of mechanism which is designed to hold the ram. Any such mechanism is located on the bore assembly 12 in such a way that neither the mechanism nor the ram interferes with the operation of the animal behavior shaping device 10.

The spring assembly 14 is held by and secured within the interior of the bore assembly 12, such that the longitudinal axis of the spring assembly 14 corresponds to the longitudinal axis of the bore assembly 12. As best illustrated in FIG. 3, the spring assembly 14 includes the spring 90 and, preferably, at least one end cap 70b. More preferably, the spring assembly 14 includes two end caps 70a, 70b. The spring 90 may be any commercially-available spring with a spring rate (i.e. the "strength" of the spring) that is sufficient to propel the motivational item 68 the desired distance.

Preferably, the spring 90 is selected such that the spring assembly 14 is capable of propelling the motivational item 68 over a range of approximately 1 to 50 feet. Generally, the spring 90 is a compression-type spring. For example, a nine coil compression spring having a free (uncompressed) length of 8.5 inches, a normal compressed length of 2.5 inches, a solid height of 1.080 inches, and a spring rate of 4.0 lbs/inch may be used as the spring. Such a spring is available from Century Spring Corp., Los Angeles, Calif. Alternatively, where it desirable to propel the motivational item 68 a greater distance, a 14.5 coil compression spring having a free length of 11.8 inches, a normal compressed length of 3.8 inches, a solid height of 2.26 inches, and a spring rate of 5.4 lbs/inch may be used as the spring. However, any type of spring known in the art may be used in place of the compression-type spring described herein. Likewise, other types of force accumulator pistons, such as those utilizing air pressure or carbon dioxide or other gas pressure, may be used in place of the spring without departing from the scope of the present invention.

The end caps 70a, 70b are generally constructed of a resilient and low-friction material such as PVC or plastic. The end caps 70a, 70b include cylindrical body portions 92a, 92b, which include threaded interior portions 94a, 94b and unthreaded interior portions 96a, 96b. The end caps 70a, 70b also include threaded end portions 98a, 98b. The end caps 70a, 70b have sufficient thickness and strength to resist deformation when the spring assembly 14 is shifted to its compressed position and sufficient durability to resist wear from the trigger assembly 16. In particular, the end portions 98a, 98b must substantially resist deformation as the spring assembly 14 is shifted from its uncompressed configuration to its compressed configuration. Preferably, the cylindrical body portions 92a, 92b include a plurality of curved ridges or vanes, or other similar structures, which run along the outer wall of the cylindrical body portions 92a, 92b in a direction which is parallel to the longitudinal axis of the cylindrical body portions 92a, 92b. The curved ridges add strength to the cylindrical body portions 92a, 92b and also reduce the amount of friction between the end caps 70a, 70b and the wall 26 of the elongated tube 24. Additionally, the presence of the curved ridges reduces the likelihood of the jamming of the spring assembly 14 by foreign materials, such as sand, dirt, leaves, plant material, and other matter.

The end caps 70a, 70b are secured to the ends of the spring 90 in such a way that the end caps 70a, 70b do not detach from the spring 90 when the spring assembly 14 is released from its compressed position to propel the motivational item 68 from the animal behavior shaping device 10. In one embodiment of the present invention, the cylindrical body portions 92a, 92b of the end caps 70a, 70b include small lips 100a, 100b which extend from the inner surfaces of the unthreaded portions 96a, 96b of the cylindrical portions 92a, 92b and project into the interior of the cylindrical portions 92a, 92b. The lips 100a, 100b include notches therein, such that the lips 100a, 100b do not extend from the inner surfaces of the cylindrical portions 92a, 92b over the entire circumference of the cylindrical portions 92a, 92b. The notches may be formed when the cylindrical portions 92a, 92b are initially manufactured, or may be formed by removing short portions of the lips 100a, 100b after the cylindrical portions 92a, 92b have been manufactured. The notches in the lips 100a, 100b allow the spring 90 to be threaded into the unthreaded portions 96a, 96b of the cylindrical body portions 92a, 92b, such that the first coil of the spring 90 is on one side of the lips 100a, 100b and the remaining coils of the spring 90 are on the opposite side of the lips 100a, 100b. Alternatively, the lips 100a, 100b may be sized in such a way as to allow the end of the spring 90 to "snap" over the lips 100a, 100b.

Once the first coil of the spring 90 is on the side of the lips 100a, 100b opposite the remaining coils of the spring 90, such that the first coil of the spring 90 is generally located at the intersection between the unthreaded portions 96a, 96b and threaded portions 94a, 94b of the cylindrical body portions 92a, 92b of the end caps 70a, 70b, the end portions 98a, 98b, which include exterior threads running around the outer diameter of the end portions 98a, 98b, is threaded into the threaded portions 94a, 94b of the cylindrical body portions 92a, 92b. The end portions 98a, 98b are threaded into the threaded portions 94a, 94b of the cylindrical body portions 92a, 92b until the first coil of the spring 90 is tightly secured, or sandwiched, between the end portions 98a, 98b and the lips 100a, 100b of the cylindrical body portions 92a, 92b. Thus, the end caps 70a, 70b are secured to the spring 90.

Alternatively, the end caps 70a, 70b may be secured to the spring 90 in any way generally known in the art, such as through the use of adhesives to attach the end caps 70a, 70b to the spring 90, by threading the end of the spring 90 into the end caps 70a, 70b, or by molding the end caps 70a, 70b directly onto the end of the spring 90.

Preferably, the end portions 98a, 98b of the end caps 70a, 70b are slightly thicker than the wall of the cylindrical portions 92a, 92b, in order to better resist deformation of the end caps 70a, 70b as the spring assembly 14 is shifted to its compressed position. The end portions 70a, 70b and cylindrical body portions 92a, 92b have dimensions which are sufficient to resist deformation of the end caps 70a, 70b and to aid in the alignment of the spring 90, yet do not interfere with the shifting of the spring assembly 14 into its compressed state. That is, when the spring assembly 14 is in its compressed state, there is at least some minimal clearance between outer walls 102a, 102b of the cylindrical body portions 92a, 92b and the wall 26 of the elongated tube 24, such that the end caps 70a, 70b are not tightly wedged within the elongated tube 24.

The end caps 70a, 70b have an outer diameter that is slightly less than the inner diameter of the elongated tube 24, such that the end caps 70a, 70b may move in a longitudinal direction within the elongated tube 24 without the wall 26 of the elongated tube 24 interfering with such movement, while the spacing between the outer walls 102a, 102b of the end caps 70a, 70b and the wall 26 of the elongated tube 24 is such that the axial movement of the spring assembly 14 within the elongated tube 24 is limited. That is, the spacing between the outer walls 102a, 102b of the end caps 70a, 70b and the wall 26 of the elongated tube 24 is such that the spring assembly 14 may be inserted or removed or shifted from its uncompressed position to its compressed position with ease and with very little friction between the outer walls 102a, 102b of the end caps 70a, 70b and the wall 26 of the elongated tube 24. Likewise, the spacing between the outer walls 102a, 102b of the end caps 70a, 70b and the wall 26 of the elongated tube 24 is such that the axial movement of the spring assembly 14 relative to the longitudinal axis of the bore assembly 12 is limited to ease the shifting of the spring assembly 14 to its compressed position.

The end caps 70a, 70b preferably define at least one aperture 104 and more preferably define at least two apertures 104 for receiving the pins 66 for securing the spring assembly 14 within the elongated tube 24. The pins 66 are inserted through the apertures 64 within the wall 26 of the elongated tube 24 and into the apertures 104 in the end caps 70a, 70b. While it is preferred that both end caps 70a, 70b of the spring assembly 14 include the apertures 104, such that the end caps 70a, 70b are interchangeable and the spring assembly 14 may be inserted within the elongated tube 24 in either longitudinal direction, one end cap 70a may include the apertures 104 while the other end cap 70b does not include any apertures. Additionally, while the use of apertures 104 to receive the pins 66 is described herein, other structures may be used in place of the apertures 104 to receive the pins 66 and secure the spring assembly 14 within the elongated tube 24. For example, the end caps 70a, 70b may include a slot which receives the pins 66, a lip which may be held between the pins 66 and the housing 22 or some type of bulkhead within the elongated tube 24, or other similar structure which prevents the shifting of the spring assembly 14 in a longitudinal direction once the pins 66 have ben inserted. Likewise, the apertures 104 may be omitted altogether if the spring assembly 14 is secured to the elongated tube 24 by some other method, such as with adhesives or by threading the spring assembly 14 into a threaded bore within the bore assembly 12. Additionally, as discussed above, while the use of the pins 66 is discussed herein, other similar connectors, such as nails, inserts, screws, thumbscrews, and bolts, may be used in place of the pins 66.

Optionally, the end portions 98a, 98b of the end caps 70a, 70b may include a small projection or nipple which extends from the center of the end portions 98a, 98b. Such a projection may be sized to correspond with the inner diameter of a PVC pipe which is used as a ram to shift the spring assembly 14 from its uncompressed position to its compressed position. That is, such a projection may be utilized to prevent the axial shifting of the ram while the spring assembly 14 is compressed.

Figure 4:
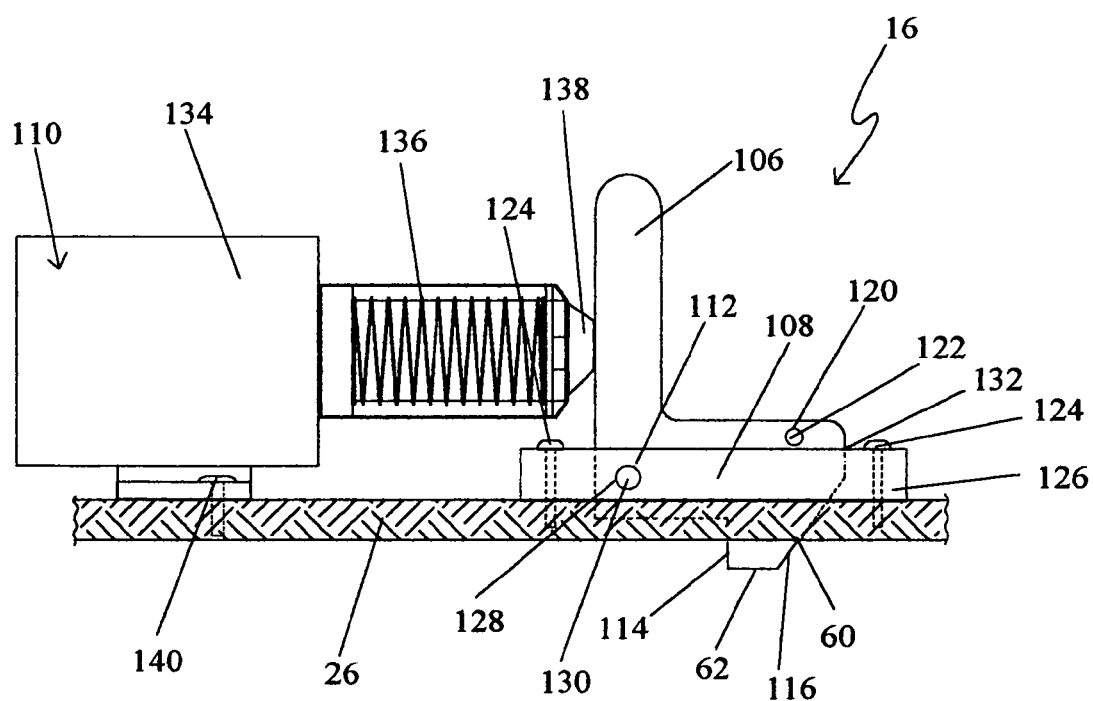
FIG. 4 is an enlarged partial sectional view of the animal behavior shaping device of FIG. 1 showing the trigger assembly as viewed along line 1-1 of FIG. 7.

As best illustrated in FIG. 4, the trigger assembly 16 includes a trigger portion 106, a pivot assembly 108, and a solenoid assembly 110. The trigger portion 106 includes the trigger latch 62, which is preferably integral to the trigger portion 106. While the trigger portion 106 is illustrated herein as having a roughly "L" shape, the trigger portion 106 may have a variety of shapes and forms which may be utilized in connection with the present invention. For example, a roughly triangular or rectangular shape may also be used for the trigger portion 106. Preferably, the trigger portion 106 is constructed of a strong material, such as metal, high density plastic, or other similar material. For example, the trigger portion 106 may be constructed of 0.25 inch sheet aluminum.

The trigger latch 62 extends from the trigger portion 106 opposite a pivot pin aperture 112. When the trigger assembly 16 is in its untriggered, resting position, the trigger latch 62 projects through the trigger latch aperture 60 in the wall 26 of the elongated tube 24 and projects into the interior of the elongated tube 24. When the spring assembly 14 is in its compressed position, the trigger latch 62 engages the end portion 98b of the end cap 70b, such that the spring assembly 14 is held in its compressed position by the trigger latch 62.

Preferably, the trigger latch 62 includes a straight edge 114 and an angled edge 116. The straight edge 114 of the trigger latch 62 is located such that the straight edge 114 contacts the end portion 98b of the end cap 70b when the spring assembly 14 is in its compressed position. The angled edge 116 of the trigger latch 62 is located opposite the straight edge 114 and allows the end cap 70b of the spring assembly 14 to shift the trigger latch 62 out of the interior of the elongated tube 24 as the spring assembly 14 is moved from its uncompressed position to its compressed position. That is, as the spring assembly 14 is moved from its uncompressed position to its compressed position, a leading edge 118 of the cylindrical portion 92b of the end cap 70b comes into contact with the angled edge 116 of the trigger latch 62. As the compression of the spring assembly 14 continues, the leading edge 118 moves along the angled edge 116 of the trigger latch 62 and gradually causes the trigger latch 62 to be shifted in an axial direction, away from the interior of the elongated tube 24, and allows the end cap 70b to pass by the trigger latch 62 without engaging the trigger latch 62. Once the spring assembly 14 reaches its compressed position, the end portion 98b of the end cap 70b passes by the trigger latch 62 and the force exerted by the solenoid assembly 110 on the trigger portion 106 causes the trigger latch 62 to project into the interior of the elongated tube 24 once again. The straight portion 114 of the trigger latch 62 then engages the end portion 98b of the end cap 70b, thus holding the spring assembly 14 in its compressed position.

The trigger portion 106 preferably includes an aperture 120 for receiving a trigger stop 122, if the trigger stop 122 is not integral to the trigger portion 106. Alternatively, the trigger stop 122 may be formed integral to the trigger portion 106. When the trigger stop 122 is used, the trigger stop 122 limits the distance the trigger latch 62 projects into the interior of the elongated tube 24 when the trigger portion 106 is in its resting, untriggered position. Preferably, the trigger stop 122 includes small plastic caps which cover and protect the trigger stops 122 and limit the noise caused by the trigger stop 122 coming into contact with the pivot assembly 108. The trigger portion 106 also includes a pivot pin aperture 112 for receiving a pivot pin 130.

The trigger assembly 16 also includes the pivot assembly 108. The pivot assembly 108 is attached directly to the wall 26 of the elongated tube 24 using any attachment means known in the art, such as screws, bolts, connectors, or adhesives. For example, in one embodiment of the present invention the pivot assembly 108 is attached to the elongated tube 24 with screws 124. The pivot assembly 108 may be made of a variety of high strength materials similar to those from which the trigger portion 106 is constructed. For example, the pivot assembly 108 may be constructed of 0.25 inch thick aluminum sheet.

The pivot assembly 108 includes a base plate 126, which defines a pair of apertures 128 for receiving the pivot pin 130 and a large center slot or aperture 132 for receiving the trigger portion 106 and trigger latch 62. The base plate 126 can take a variety of configurations, such as "O" shaped, "U" shaped, or two parallel members. Preferably, the base plate 126 takes the form of an "O" shaped member, wherein the trigger portion 106 extends through the middle thereof. The base plate 126 also provides a surface for contacting the trigger stop 122 when the trigger stop 122 is utilized as part of the trigger portion 106.

The pivot pin apertures 128 of the base plate 126 receive the pivot pin 130, which secures the trigger portion 106 to the base plate 126. The pivot pin 130 extends through the first aperture 128, then through the pivot pin aperture 112 of the trigger portion 106, and finally into the second aperture of the base plate 126. While it is preferred that a separate pivot pin 130 be used, the pivot pin may alternatively be formed integral to the trigger portion 106, such that there are a pair of pins, each of which extends into one of the pivot pin apertures 128 of the pivot assembly 108. The pivot pin 130 and the pivot pin apertures 128 and 112 of the base plate 126 and the trigger portion 106, respectively, allow the trigger portion 106 rotated relative to the pivot assembly 108. That is, the pivot pin 130 allows the trigger portion 106 to be rotated from a non-triggered position, in which the trigger latch 62 projects into the interior of the elongated tube 24 to engage the spring assembly 14, to a triggered position, in which the trigger latch 62 has been withdrawn from the interior of the elongated tube 24 and no longer engages the spring assembly 14.

The trigger assembly 16 also includes the solenoid assembly 110. The solenoid assembly 110 includes a solenoid 134, a solenoid return spring 136, and trigger cushion 138. The solenoid 134 may be of any commercially available type of solenoid, but is preferably a pull solenoid or, more preferably, is a 12 volt direct-current (DC) pull solenoid. For example, the solenoid 134 may be a 12 volt DC pull solenoid, model number P613-C1V12, or another 613 series solenoid, available from Trombetta+-® Motion Technologies, Menomonee Falls, Wis. The solenoid 134 is attached to the wall 26 of the elongated tube 24 in any way generally known in the art. That is, the solenoid 134 may be attached to the elongated tube 24 using adhesives, connectors, fasteners, or other similar methods. Preferably, the solenoid 134 is attached to the elongated tube 24 using screws 140.

The solenoid assembly 110 also includes the solenoid return spring 136, which causes the solenoid 134 to return to its resting position after it has been triggered. The solenoid return spring 136 is generally part of the solenoid 134. The solenoid return spring 136 is selected to correspond to the solenoid 134 used, such that the solenoid return spring 136 has a spring rate that is sufficient to fully return the solenoid 134 to its resting position after it has been triggered. Additionally, the solenoid return spring 136 is selected such that it corresponds with the force that the solenoid 134 is subjected to by the spring assembly 14 through the trigger assembly 16, such that spring rate of the solenoid return spring 136 substantially balances the force to which the solenoid 134 is subjected by the trigger assembly 106. That is, when the spring assembly 14 is in its compressed position, the spring assembly 14 presses against the trigger latch 62, thus causing the trigger latch 62 to have a tendency to try to move out of the interior of the elongated tube 24, which in turn causes the trigger assembly 106 to press up against the solenoid assembly 110. The spring rate of the solenoid return spring 136 is selected such that the solenoid return spring 136 substantially balances (i.e. just slightly exceeds) this force, thus keeping the trigger assembly 106 in a neutral position and minimizing the power needed to operate the solenoid 134.

The trigger cushion 138 is located at the interface between the solenoid 134 and the trigger portion 106. The trigger cushion 138 is constructed of any type of cushion material, such as rubber, plastic, foam, or other similar material. The trigger cushion 138 may be deformed slightly by the trigger portion 106 as the trigger portion 106 is pressed toward the solenoid 134 through the action of the spring assembly 14, but does not deform an amount that is sufficient to allow the trigger latch 62 to disengage from the spring assembly 14. The trigger cushion 138 preferably includes a rod which is integral to the trigger cushion 138 and which replaces the rod of the solenoid 134, such that when the solenoid 134 is triggered, the trigger cushion 138 is also allowed to move toward the interior the solenoid 134 and away from the resting position of the trigger portion 106. Generally, the trigger cushion 138 is forced to move toward the interior of the solenoid 134 by the pressure exerted upon it by the trigger portion 106 when the solenoid 134 is triggered. The trigger cushion 138 provides a cushioned interface between the solenoid 134 and the trigger portion 106, thereby reducing the wear on the solenoid 134 and the trigger portion 106 caused by the use of the animal behavior shaping device 10 and preventing the entry of dirt, sand, and other debris into the solenoid 134. While the solenoid assembly 110 preferably includes the trigger cushion 138, the trigger cushion 138 may alternatively be omitted from the solenoid assembly 110.

Optionally, the solenoid 134 may include a cushioning material, such as a rubber or plastic o-ring within the solenoid 134 to reduce the noise caused by the triggering of the solenoid. Preferably, the cushioning material is configured in such a way that the solenoid 134 makes only a single noise or click when it is triggered, rather than the two separate noises which a standard solenoid makes as the solenoid 134 is triggered and then returns to its resting configuration. For example, the solenoid 134 may include a rubber o-ring within the interior of the solenoid opposite the trigger portion 106, such that the solenoid 134 does not make a noise as it is pulled back and only makes a click as the solenoid return spring 136 returns the solenoid 134 to its resting configuration.

The receiver 18 is held within the housing 22 of the bore assembly 12 and is of any commercially available design and operates on any commercially available operating frequency. As the components and construction of commercially available receivers are well known in the art, in the interests of brevity the interior components and construction of the receiver 18 will not be discussed in detail. Preferably, the receiver 18 is a 12 volt, direct-current receiver that operates on a frequency of 315 MHz or 433.92 MHz. For example, the receiver 18 may be in the form of the type of receiver used in connection with remotely activated car alarms, car or truck door locks, or remote automobile starting mechanisms, such as an Enforcer® SK-910 series RF receiver available from Seco-Larm® U.S.A., Inc., Irvine, Calif.

The receiver 18 may be a two (2) channel receiver or a one (1) channel receiver of a type which is generally commercially available. More preferably, the receiver 18 is a two channel receiver. If a two channel receiver is used in connection with the present invention, one channel generally triggers the release of the motivational item 68 from the animal behavior shaping device 10 while the other channel usually toggles firing circuit of the animal behavior shaping device 10 on or off (effectively acting as a "safety" or "on/off" toggle for the device). Where a one channel receiver is used, the single channel generally triggers the release of the motivational item 68 from the animal behavior shaping device 10.

While certain preferred configurations for the channel(s) of the receiver 18 are discussed herein, it will be apparent to those skilled in the art that any configuration could be used for the channel(s) of the receiver 18. For example, one of the channels may trigger a marking accessory 410 or another accessory, or may be used to cancel the delivery of the motivational item 68 by the animal behavior shaping device 10. While the receiver 18 as discussed herein is preferably a one or two channel receiver, the receiver 18 may also be in the form of a multiple-channel receiver that has any number of channels in order to add further functionality to the animal behavior shaping device 10.

The receiver 18 also preferably includes at least one antenna 40 which is attached to the receiver 18 and extends through and projects from the housing 22 of the bore assembly 12 for receiving a signal transmitted by a transmitter. Any type of antenna known in the art may be used as the antenna 40.

The receiver 18 optionally may include at least one mode switch or button. Such a mode switch may be used to change the operation of each channel, or both channels, of the receiver 18. For example, the mode switch may allow the receiver 18 to enter its learning mode to learn the code of a new transmitter, to clear any previously learned codes, or to report the number of codes currently stored by the receiver 18.

Optionally, the receiver 18 may include the electronics necessary for additional functionality of the animal behavior shaping device 10. For example, where certain electronic noises are desired to be made as the animal behavior shaping device 10 is triggered, the receiver 18 may include the electronics and the speaker necessary to produce the desired sound. Likewise, if the trainer desires that a delay of a certain amount of time occur before the release of the motivational item 68 by the animal behavior shaping device 10 (for example, where the animal is supposed to remain in a certain desired position for a specific amount of time after reaching the position), a timing circuit or other timing device that delays the release of the motivational item 68 for a predetermined time after receiving the transmitted signal may be incorporated into the receiver 18.

The animal behavior shaping device 10 also includes the battery 20, which is held within the housing 22 of the bore assembly 12. The battery 20 may be of any type of battery known in the art, but preferably is a rechargeable battery or, more preferably, is a 12 volt direct-current, 1.3 amp-hour (AH) rechargeable battery. The battery 20 is of any conventional construction and includes any desired fuses and terminals. For example, the battery 20 may be a 12 volt, 1.3 AH, Model WKA12-1.3F rechargeable battery available from BatteriesPlus® LLC, Green Bay, Wis. The battery 20 is preferably held within the housing 22 of the bore assembly 12. The battery 20 is preferably connected to the power connector 48 on the exterior of the housing 22, such that a power source may be attached to the animal behavior shaping device 10 to recharge the battery 20 without removing the battery 20 from the housing 22.

The other internal components of the animal behavior shaping device 10, including a relay 142 for triggering the solenoid 134, and the wiring connecting the various components of the animal behavior shaping device 10 are generally held within the housing 22 of the bore assembly 12. As the wiring and other internal components necessary for the operation of the animal behavior shaping device 10, such as the wiring connecting the solenoid 134, the battery 20, and the receiver 18, are generally known in the art and will be readily evident to those skilled in the art, the specific wiring of the internal components of the animal behavior shaping device 10 will not be described in detail herein. Any standard wiring and internal component configuration may be used in connection with the animal behavior shaping device 10 to connect the internal components.

The battery 20, the receiver 18, and other internal components of the animal behavior shaping device 10 may be held within the housing 22 of the bore assembly 12 in any way known in the art, such as through the use of o-rings, inserts, internal bulkheads, adhesives, and connectors, such that the battery 20, the receiver 18, and other internal components remain in position within the housing 22 when the animal behavior shaping device 10 is being transported. That is, the battery 20, the receiver 18, and other internal components are held within the housing 22 in such a way as to minimize or prevent potential damage to the components due to the shifting of the components within the housing 22 during transport.

The animal behavior shaping device 10 may use any decorative configuration for the exterior of the device 10. However, it is preferred that the animal behavior shaping device 10 include a camouflaged exterior, such that the device 10 may be more easily hidden from the animal, such as in leaves, bushes, long grasses, or other environmental conditions, during training. Any generally available and generally known camouflage design may be used.

Figure 12:
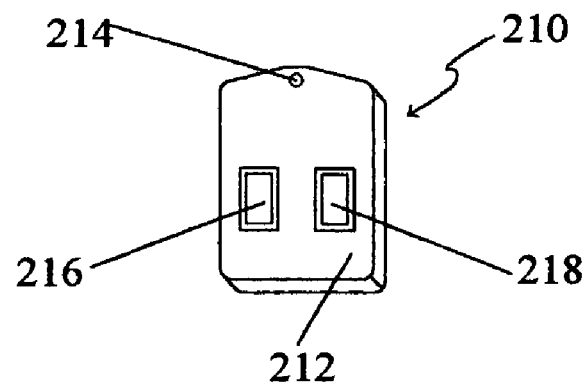
FIG. 12 is a perspective view of a handheld wireless transmitter for use with the animal behavior shaping device of FIG. 1.

Referring to FIG. 12, a handheld wireless transmitter 210 which may be used in connection with the present invention is illustrated. The handheld wireless transmitter 210 is a commercially available handheld wireless transmitter and is selected to operate in conjunction with and on the same frequency as the receiver 18. Preferably, the handheld transmitter is a two (2) channel transmitter, but a single channel or multiple channel transmitter may also be utilized. As the handheld wireless transmitter 210 is generally of a commercially available design, a detailed description of the internal electronics of the handheld wireless transmitter 210 is omitted in the interest of brevity.

As discussed above, the wireless transmitter 210 is selected such that the transmitter 210 operates in conjunction with the receiver 18. That is, the handheld wireless transmitter 210 operates on a frequency that may be received by the receiver 18. For example, where the receiver 18 operates on a frequency of 315 MHz or 433.92 MHz, the handheld wireless transmitter 210 also operates on a frequency of 315 MHz or 433.92 MHz. Likewise, where the receiver 18 is in the form of a type of receiver used in connection with remotely activated car alarms, car or truck door locks, or remote automobile starting mechanisms (such as an Enforcer® SK-910 series RF receiver available from Seco-Larm® U.S.A., Inc., Irvine, Calif.), the handheld transmitter 210 is also in the form of a transmitter used in connection with remotely activated car alarms, car or truck door locks, or remote automobile starting mechanisms (such as an Enforcer® SK-917 or SK-919 series RF transmitter available from Seco-Larm® U.S.A., Inc., Irvine, Calif.).

The handheld transmitter 210 includes an outer housing 212, which is preferably made from a material, such as high-impact plastic, which protects the internal components of the transmitter 210 from damage and from the elements. The housing 212 may optionally be adapted to be attached to or be more easily carried by the trainer. For example, the housing 212 may define a small aperture 214 which allows the handheld transmitter 210 to be attached to a key-ring or other suitable object or may include a clip that allows the handheld transmitter 210 to be clipped to the trainer's belt or clothing.

The handheld transmitter 210 includes a pair of buttons 216,218 that may be pressed to activate the handheld transmitter 210 and transmit a signal on the selected channel. If a single channel transmitter is utilized, the handheld transmitter 210 may include only a single button, while multiple buttons may be used if a multiple channel transmitter is utilized. Where a two channel receiver 210 and a two channel handheld transmitter 210 are used, one button 216 activates Channel 1 and the second button 218 activates Channel 2. The operation which is triggered by the operation of the buttons 216, 218 is controlled by the configuration of the receiver 18 of the animal behavior shaping device 10. For example, one button 216 may trigger the release of the motivational item 68 from the animal behavior shaping device 10, while the other button 218 may place the animal behavior shaping device 10 in "safe" mode, such that an accessory cannot trigger the release of the motivational item 68. Alternatively, one of the buttons 216, 218 may activate a marking noise or a game call. Thus, the buttons 216, 218 of the handheld transmitter 210 may be configured to operate the animal behavior shaping device 10 in a variety of different ways depending upon the configuration of the receiver 18.

Optionally, the handheld transmitter 210 may include one or more LED's or lights which indicate the current status of one or more of the channels of the handheld transmitter 210.

The handheld transmitter 210 is powered by a battery. The battery may be of any type known in the art, including a rechargeable battery, a non-rechargeable battery, or a watch-type battery. Preferably, the battery is of a type which is generally used in commercially available wireless transmitters.

Several other accessories may be used in conjunction with the present invention. Some accessories are intended to function in conjunction with, or in the place of, the handheld wireless transmitter 210, while other accessories add additional functionality to the animal behavior shaping device 10 when they are used.

Figure 13:
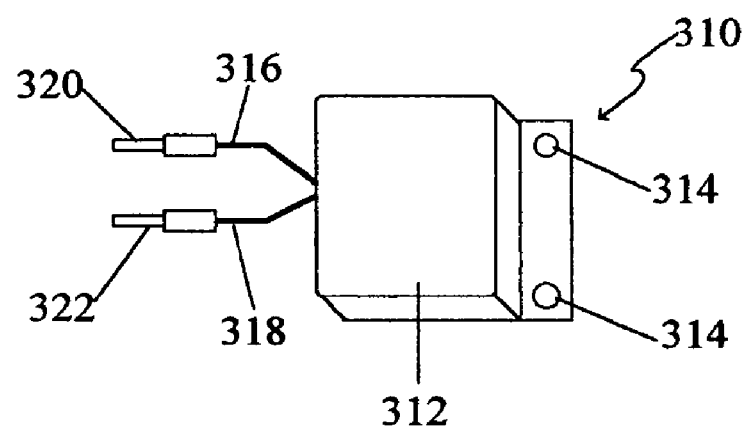
FIG. 13 is a perspective view of a motion detector accessory for attachment to and use with the animal behavior shaping device of FIG. 1.

FIG. 13 illustrates a motion detector accessory 310 that may be used in connection with the present invention. The motion detector accessory 310 includes an outer housing 312, which surrounds and protects the internal components of the motion detector accessory 310, and attachment points 314 that allow the motion detector accessory 310 to be attached to the attachment points 32, 58 located on the animal behavior shaping device 10. The housing 312 is generally constructed of a material, such as high impact plastic, which protects the internal components of the motion detector accessory 310, without interfering with the operation of a motion detector held therein. The location and type of the attachment points 314 is selected to correspond with the attachment points 32, 58 located on the animal behavior shaping device 10. For example, where the animal behavior shaping device 10 includes attachment points 32, 58 in the form of a pair of threaded metal inserts, the attachment points 314 of the motion detector accessory 310 are in the form of a pair of apertures which may receive thumbscrews, screws, or other connectors, such that the motion detector accessory 310 may be secured to the animal behavior shaping device 10 by threading the connectors through the apertures and into the threaded metal inserts of the attachment points 314 of the animal behavior shaping device 10. Alternatively, the attachment points 314 or outer housing 312 may include other hardware, such as clips, hooks, or other similar structures, which allow the motion detector accessory 310 to be mounted on a separate structure.

The motion detector accessory 310 includes any commercially available motion detector. Preferably, the motion detector is in the form of a microwave motion sensor, such as those commonly used in connection with automobile and building security systems. For example, the motion detector accessory 310 may utilize a Space Enforcer® SLI® series microwave motion sensor available from Seco-Larm® U.S.A., Inc., Irvine, Calif. However, other types of motion sensors, such as that use infra-red or ultrasonic motion sensors, may alternatively be used.

The motion detector accessory 310 includes two wires 316, 318 which include two connectors 320, 322 for connecting the motion detector accessory 310 to the connectors 48,50 of the animal behavior shaping device 10. One wire 316 is a power wire and supplies the motion detector accessory 310 with power from the battery 20 of the animal behavior shaping device 10. The power wire 316 includes the power connector 320, such as a male Size M DC power jack, which can be received by the power connector 48 of the animal behavior shaping device 10. The second wire 318 is a signal wire and transmits the signal from the motion detector accessory 310 to the animal behavior shaping device 10. The signal wire 318 includes the signal connector 322, such as a male ⅛" mono phone jack, which may be received by one of the signal connectors 50 of the animal behavior shaping device 10.

In order to use the motion detector accessory 310, the motion detector accessory 310 is attached to the animal behavior shaping device 10 using the attachment points 314. The power connector 320 of the power wire 316 is then connected to the power connector 48 of the animal behavior shaping device 10 and the signal connector 322 of the signal wire 318 is connected to the signal connector 50 of the animal behavior shaping device 10. When the motion detector senses movement, the motion detector accessory 310 transmits a signal through the signal wire 318 to the animal behavior shaping device 10, which causes the animal behavior shaping device 10 to release the motivational item 68. The motion detector accessory 310 may be used along with the handheld wireless transmitter 210, such that the handheld transmitter 210 may be used to effectively turn the motion detector accessory 310 on and off by blocking or allowing the signal from the motion detector accessory 310 to trigger the release of the motivational item 68 from the animal behavior shaping device 10, or may be used without the handheld transmitter 210, such that the animal behavior shaping device 10 always releases the motivational item 68 when it senses movement.

While a wired motion detector accessory 310, which is attached directly to the animal behavior shaping device 10, is discussed herein, it will be apparent to those skilled in the art that a wired motion detector accessory that is not attached directly to the animal behavior shaping device 10 or a wireless motion detector accessory which incorporates a wireless transmitter similar to that in the handheld transmitter 210, as well as a battery to power the motion sensor, may alternatively be used with the animal behavior shaping device 10. Likewise, the motion detector accessory 310 may also be configured such that the motion detector accessory 310 may be mounted on a separate structure.

Figure 14:
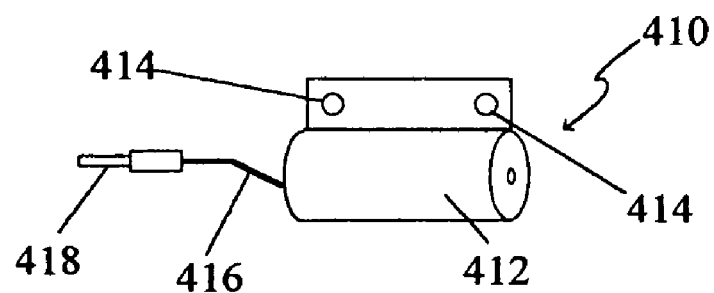
FIG. 14 is a perspective view of a marking accessory for attachment to and use with the animal behavior shaping device of FIG. 1.

Referring to FIG. 14, a clicker or marking accessory 410 may also be used in connection with the animal behavior shaping device 10, such that the animal behavior shaping device 10 is configured to emit an audible "marking" sound when the device 10 is triggered. The marking accessory 410 includes a clicker solenoid 412 and attachment points 414 that allow the marking accessory 410 to be attached to the attachment points 32, 58 of the animal behavior shaping device 10.

The clicker solenoid 412 may be any type of commercially available solenoid that is designed to emit an audible click, sound, or noise when the clicker solenoid 412 is activated. Preferably, the clicker solenoid 412 is of a type that is smaller than, and has lower power requirements than, the solenoid 134 of the trigger assembly 16, so as to reduce the power requirements for the animal behavior shaping device 10. For example, the clicker solenoid 412 may be a 12 volt DC pull solenoid, model number P608-A2V12, or another 608 series solenoid, available from Trombetta+-® Motion Technologies, Menomonee Falls, Wis.

The location and type of the attachment points 414 of the marking accessory 410 are selected to correspond with the attachment points 32, 58 on the animal behavior shaping device 10. For example, where the animal behavior shaping device 10 includes attachment points 32, 58 in the form of a pair of threaded metal inserts, the attachment points 414 of the motion detector accessory 410 defines a pair of apertures to receive thumbscrews, screws, or other connectors, such that the marking accessory 410 may be secured to the animal behavior shaping device 10 by threading the connectors into the threaded metal inserts.

The marking accessory 410 includes a signal wire 416 which includes a signal connector 418 which allows the marking accessory 410 to receive a signal from the animal behavior shaping device 10. The signal connector 418 is a type of connector that can be received by one of the signal connectors 50 of the animal behavior shaping device 10. For example, the signal connector 418 of the marking accessory 410 may take the form of a male 1/8" mono phone jack.

In order to use the marking accessory 410, the marking accessory 410 is attached to the animal behavior shaping device 10 using the attachment points 414, and the signal connector 418 of the signal wire 416 is connected to one of the signal connectors 50 of the animal behavior shaping device 10. Preferably, the signal connector 50 to which the signal connector 418 is attached is configured to send a momentary 12 volt electrical signal to the marking accessory 410 when the receiver 18 receives a signal from the handheld transmitter 210 or a different accessory, such that the marking accessory 410 is triggered, and the clicker solenoid 412 is activated, when such a signal is received. As a result, when the animal behavior shaping device 10 receives a signal, from whatever transmitter the trainer may be using, the marking accessory 410 is triggered. The animal behavior shaping device 10 may be configured to trigger only the marking accessory 410 when a signal is received (such that no motivational item 68 is released when the marking accessory 410 is triggered), or may be configured to trigger both the operation of marking accessory 410 and the release the motivational item 68 when the animal behavior shaping device 10 receives the signal. Where the trainer desires to trigger the operation of the marking accessory 410 separately from the release of the motivational item 68, the operation of the marking accessory 410 and the release of the motivational item 68 may be configured to be triggered by different channels of the receiver 18.

While the use of a clicker solenoid 412 is discussed in connection with the marking accessory 410, any other noisemaking device generally used in the training of animals, such as speakers, other mechanical clickers, and other noisemakers, may be used in place of the clicker solenoid 412 without departing from the scope of the present invention. For example, the marking accessory may utilize a game caller or wildlife caller, such as Model 512 or 612 Series Game Callers available from Johnny Stewart Wildlife Calls, Waco, Tex. If such a noisemaking device requires additional power from the animal behavior shaping device 10 to operate, the noisemaking device may include a power connector to connect the noisemaking device to the power connector 48 of the animal behavior shaping device 10.

Additionally, while the marking accessory 410 discussed herein is attached directly to the animal behavior shaping device 10, an alternative marking accessory may be designed such that the marking accessory is separate from the animal behavior shaping device 10 and is connected thereto by a wire or a wireless transmitter/receiver. In particular, where a game caller, which is a much larger device, is to be used as the marking accessory, the game caller generally is not directly mounted on the animal behavior shaping device 10, but instead is located on the ground near the animal behavior shaping device 10.

Figure 15:
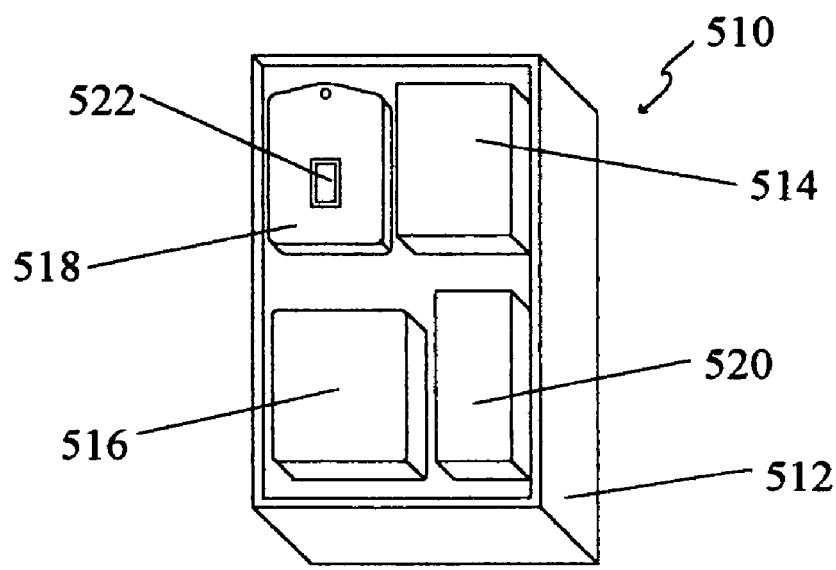
FIG. 15 is a perspective view of a shock sensor accessory for use with the animal behavior shaping device of FIG. 1.

Yet another accessory which may be used in conjunction with the animal behavior shaping device 10, a shock sensor accessory 510, is illustrated in FIG. 15. The shock sensor accessory 510 is generally intended to be placed within an item which the animal is being trained to come into contact with, such a suitcase or other container being used in connection with the training of animals to find drugs or explosives. As such, the shock sensor accessory 510 is triggered, thereby triggering the release of a motivational item 68 from the animal behavior shaping device 10, when the animal comes into contact with the object in which the shock sensor accessory 510 is located and bumps, jars, shakes, or otherwise moves the object. The shock sensor accessory 510 includes an outer housing 512, which encloses a shock sensor 514, a battery 516, a wireless transmitter 518, and, optionally, a motion detector 520. The housing 512 is preferably constructed of a material which protects the other components of the shock sensor accessory 510, such as high impact plastic.

The shock sensor 514 may be any commercially available shock sensor. As such, the internal components of the shock sensor 514 will not be discussed herein for the sake of brevity. Preferably, the shock sensor 514 is of a type which is often used in automobile security systems and other similar devices, such as an electromagnetic shock detector. For example, the shock sensor 514 may be a SS-052 or SS-051 series electromagnetic shock sensor available from Seco-Larm® U.S.A., Inc., Irvine, Calif.

Likewise, the optional motion detector 520 may be any commercially available motion detector. The motion detector 520 is preferably in the form of a microwave motion sensor, such as those commonly used in connection with automobile and building security systems. For example, the motion detector accessory 520 may utilize a Space Enforcer® SLI® series microwave motion sensor available from Seco-Larm® U.S.A., Inc., Irvine, Calif. However, other types of motion sensors, such as that use infra-red or ultrasonic motion sensors, may alternatively be used. The optional motion detector 520 may be used when it is desirable to give the shock sensor accessory 510 the ability to be triggered both by the manipulation of an object by the animal (thereby triggering the shock detector 514) and by the movement of the animal within a certain predetermined range of the object (thereby triggering the motion detector 520) in cases where the shock sensor 514 may not be as effective (where, for example, the object in which the shock sensor accessory 510 is placed would be too large or heavy for the animal to manipulate and trigger the shock sensor 514).

When the shock sensor accessory 510 includes both the shock sensor 514 and the optional motion detector 520, the shock sensor accessory 510 includes some means, such as a switch, button, or other similar component, which allows the trainer to operate only the shock sensor 514, only the motion detector 520, or both the shock sensor 514 and the motion detector 520.

The wireless transmitter 518 of the shock sensor accessory 510 may be any commercially available wireless transmitter and generally is similar to, or the same as, the handheld wireless transmitter 210 discussed above. Generally, the wireless transmitter 518 is a single channel transmitter. The wireless transmitter 518 operates on a frequency that may be received by the receiver 18. For example, where the receiver 18 operates on a frequency of 315 MHz or 433.92 MHz, the wireless transmitter 518 also operates on a frequency of 315 MHz or 433.92 MHz. Generally, where the receiver 18 is in the form of a type of receiver used in connection with remotely activated car alarms, car or truck door locks, or remote automobile starting mechanisms (such as an Enforcer® SK-910 series RF receiver available from Seco-Larm® U.S.A., Inc., Irvine, Calif.), the wireless transmitter 518 is also in the form of a transmitter used in connection with remotely activated car alarms, car or truck door locks, or remote automobile starting mechanisms (such as an Enforcer® SK-917 or SK-919 series RF transmitter available from Seco-Larm® U.S.A., Inc., Irvine, Calif.). The wireless transmitter 518 may be configured to obtain power from the battery 516 of the shock sensor accessory 510, or the wireless transmitter 518 may include a separate battery to provide the transmitter 518 with power.

The wireless transmitter 518 preferably includes an on/off switch 522 which turns the shock sensor accessory 510 on and off. The on/off switch 522 may take any form of a switch, such as a rocker switch, a sliding switch, a rotating switch, or a button.

The battery 516 of the shock sensor accessory 510 may be of any type of battery known in the art, but preferably is a rechargeable battery or, more preferably, is a 12 volt direct-current, 0.8 amp-hour (AH) rechargeable battery. For example, the battery 516 may be a 12 volt, 0.8 AH, Model WKA12-0.8WL rechargeable battery available from BatteriesPlus® LLC, Green Bay, Wis. The battery 516 may have any conventional construction.

In order to operate the shock sensor accessory 510, the shock sensor accessory 510 is placed inside of the object which the animal is supposed to find during training. The shock sensor accessory 510 is turned on using the on/off switch 522, and the object within which the shock sensor accessory 510 is place is closed. The animal behavior shaping device 10 may then be turned on, such that the receiver 18 can receive a signal transmitted by the wireless transmitter 518. The animal is then released by the trainer and ordered to find the desired object. Once the animal finds the object and comes into contact with it, such as by bumping, jarring, shaking, or otherwise moving the object, the shock sensor 514 is triggered, which in turn causes the wireless transmitter 518 to transmit a signal to the receiver 18 of the animal behavior shaping device 10, which then releases the motivational item 68.

Figure 16:
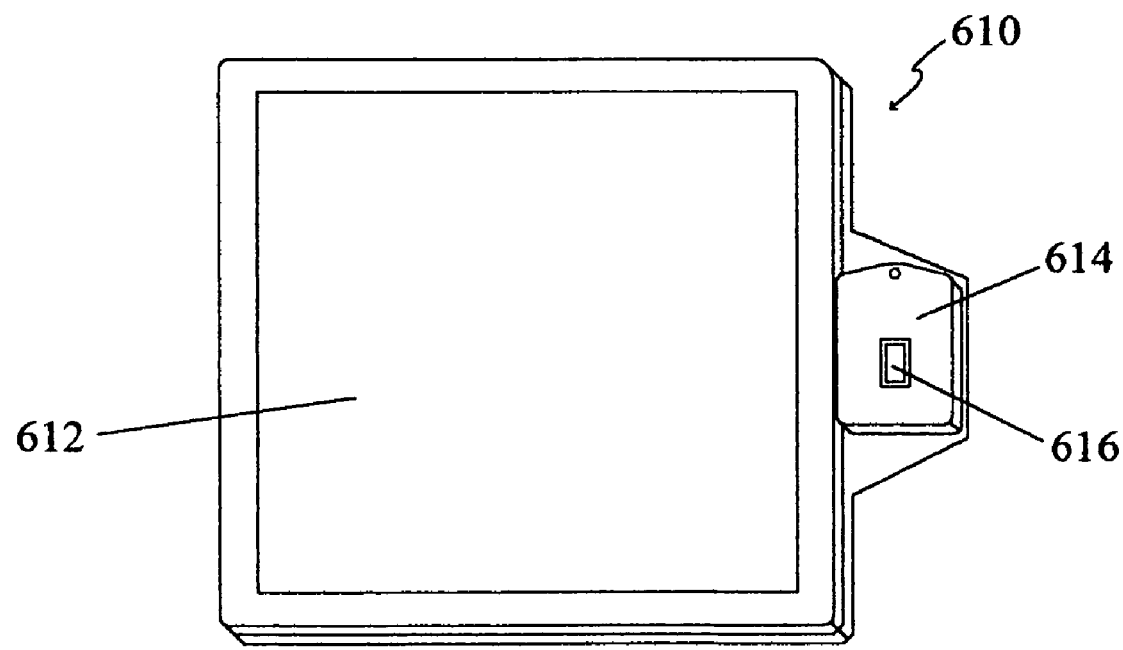
FIG. 16 is a perspective view of a pressure sensing pad accessory for use with the animal behavior shaping device of FIG. 1.

Referring to FIG. 16, a pressure sensing pad accessory 610 is illustrated. The pressure sensing pad accessory 610 may be used to trigger the animal behavior shaping device 10 when a pressure sensing pad 612 senses a predetermined amount of pressure, such as when the animal steps on the pad 612. The pressure sensing pad accessory 610 includes the pressure sensing pad 612 and a wireless transmitter 614.

The pressure sensing pad 612 may take the form of any commercially available pressure sensing pad, such as those used in connection with security systems or automatic doors. In general, the pressure sensing pad 612 comprises a lower conductive sheet, an upper conductive sheet, a foam pad that runs around the perimeter of the pressure sensing pad 612 and is located between the upper and lower conductive sheets, and a lower and an upper flexible sheet which are mounted directly to the lower and the upper conductive sheet on the outer surface of the pressure sensing pad 612, respectively, which allow the conductive sheets to spring back to their original positions after the pressure pad 612 has been triggered and protect the conductive sheets from permanent deformation. The upper and lower conductive sheets generally are constructed of annealed aluminum or copper, but alternatively any conductive material may be used. Likewise, the upper and lower flexible sheets are generally constructed from indoor/outdoor carpet, Astroturf®, or flexible plastic, but alternatively other materials, such as stiff rubber, may be used. Additionally, in some situations, such as when annealed aluminum is used for the upper and lower conductive layers, the upper and lower flexible sheets may be omitted. The foam layer may also be replaced with plastic spacers or other similar components. While the foam pad or plastic spacers generally are located only around the perimeter of the pressure pad 612, if a larger pressure pad is used, the foam pad or spacers may also form any type of pattern, such as a grid pattern or a pattern of "dots," which keeps the conductive sheets from contacting each other when the pressure pad 612 is in its resting position, while still allowing the conductive layers to come into contact when pressure is exerted on the pressure pad 612.

The wireless transmitter 614 of the pressure sensing pad accessory 610 may be any commercially available wireless transmitter and generally is similar to, or the same as, the handheld wireless transmitter 210 discussed above. Preferably, the wireless transmitter 614 is a single channel transmitter. The wireless transmitter 614 operates on a frequency that may be received by the receiver 18. For example, where the receiver 18 operates on a frequency of 315 MHz or 433.92 MHz, the wireless transmitter 614 also operates on a frequency of 315 MHz or 433.92 MHz. Generally, where the receiver 18 is in the form of a type of receiver used in connection with remotely activated car alarms, car or truck door locks, or remote automobile starting mechanisms (such as an Enforcer® SK-910 series RF receiver available from Seco-Larm® U.S.A., Inc., Irvine, Calif.), the wireless transmitter 614 is also in the form of a transmitter used in connection with remotely activated car alarms, car or truck door locks, or remote automobile starting mechanisms (such as an Enforcer® SK-917 or SK-919 series RF transmitter available from Seco-Larm® U.S.A., Inc., Irvine, Calif.). The wireless transmitter 614 includes a battery which powers the transmitter and allows the transmitter to be triggered when the upper and lower conductive sheets come into contact, thereby completing a circuit and triggering the transmission of a signal.

Although the wireless transmitter 614 of the pressure sensing pad accessory 610 is illustrated as being connected directly to the pressure sensing pad 612, the wireless transmitter 614 may alternatively be connected to the pressure sensing pad 612 with a wire of a predetermined length, such that the wireless transmitter 614 may be located near, but not directly on, the pressure sensing pad 612. Such a configuration may be useful where the wireless transmitter 614 must transmit a signal over a greater range or where the animal may damage the wireless transmitter 614 by stepping on it.

The wireless transmitter 614 preferably includes an on/off switch 616 which turns the pressure sensing pad accessory 610 on and off. The on/off switch 616 may take any form of a switch, such as a rocker switch, a sliding switch, a rotating switch, or a button.

In order to operate the pressure sensing pad accessory 610, the accessory 610 is placed in the location that the trainer wants the animal to go to or stop at. The trainer then turns the pressure sensing pad accessory 610 on using the on/off switch 616 and orders the animal to complete the desired task or run the desired route. When the animal reaches the pressure sensing pad accessory 610 and steps on the pressure sensing pad 612, the upper conductive sheet is pressed downward by the weight of the animal and comes into contact with the lower conductive sheet, thus completing a circuit and causing the wireless transmitter 614 to transmit a signal to the receiver 18 of the animal behavior shaping device 10, thereby causing the animal behavior shaping device 10 to release the motivational item 68.

While a wireless version of the pressure sensing pad accessory 610 is described herein, it will be evident to one skilled in the art that the pressure sensing pad accessory may alternatively be a wired accessory that includes a wire of a predetermined length that attaches to the animal behavior shaping device 10 without departing from the scope of the present invention.

While a number of different accessories for the animal behavior shaping device 10 are discussed herein, it will be apparent to those skilled in the art that many other accessories, both wired and wireless, and equipment may be used with the animal behavior shaping device 10 without departing from the scope of the present invention. For example, other possible accessories and equipment include, but are not limited to, a high power, long range receiver, which allows a different long range transmitter to be used with the animal behavior shaping device 10 (such as a long range wireless remote control system available from Remote Control Technology, Kirkland, Wash.), and an AC/DC adapter/battery charger, which allows the battery 20 of the animal behavior shaping device 10 to be recharged using a standard wall outlet.

In order to operate the animal behavior shaping device 10, a suitable location for training is first selected. Such a location may be anywhere that training generally occurs, and may be located either outdoors or inside a structure. The animal behavior shaping device 10 is then placed in a suitable location and raised to the desired angle using the adjustable bipod 72. Alternatively, the hook 34 may be used to hang the animal behavior shaping device 10 from a suitable elevated structure. The spring assembly 14 is shifted from its uncompressed position to its compressed position, such that the spring 90 of the spring assembly 14 stores mechanical energy therein. Once the spring assembly 14 reaches its fully compressed position, the trigger latch 62 engages the end portion 98b of the end cap 70b of the spring assembly 14 and holds the spring assembly 14 in its compressed position.

When the spring assembly 14 is in its compressed position, the spring assembly 14 presses against the trigger latch 62, which causes the trigger portion 106 to press back against the solenoid 134. The solenoid 134 and the solenoid return spring 136 act to substantially balance, and actually just slightly exceed, the force exerted on the solenoid 134 by the trigger portion 106, such that the trigger portion 106 is not allowed to move a distance sufficient to release the spring assembly 14 from its compressed position.

The motivational item 68, such as food, a toy, a dummy, a tug, a ball, a prey item, or other similar object, is inserted into the elongated tube 24, such that the motivational item 68 is substantially, or completely, held within the elongated tube 24 and rests against the end cap 70b of the spring assembly 14.

Any desired accessory is attached to the animal behavior shaping device 10. In particular, if an accessory will be utilized to trigger the release of the motivational item 68, the sensor of the accessory is positioned in the desired location, such that the animal behavior shaping device 10 will be triggered when the animal reaches a desired location or performs a desired task. For example, the trainer may desire that the transmitter be triggered with a wireless sensing device, such as a motion detector accessory 310 that senses the animal's motion with the range of the detector, a pressure sensing pad accessory 610 that senses the application of pressure by the animal on the sensor (such as the animal standing or lying on a pressure-sensitive pad), or a shock sensor accessory 510 that senses the animal's manipulation of a certain object or item (such as scratching or pawing a suitcase). The trainer of the animal may also trigger the delivery of a motivational item 68 as a reward with the wireless handheld transmitter 210. If the handheld transmitter 210 will be used to trigger the animal behavior shaping device 10 and no accessories are going to be used as part of the training of the animal, no accessory need be attached to the animal behavior shaping device 10. Where an accessory is used to trigger the release of the motivational item 68 from the animal behavior shaping device 10, the wireless handheld transmitter 210 may also be used to place the animal behavior shaping device 10 in "safe" mode, such that the animal behavior shaping device 10 does not release the motivational item 10 when the accessory is triggered. Such a "safe" mode may be useful when the animal does not sufficiently or correctly accomplish the task, but will have otherwise caused the accessory to trigger the release of the motivation item 68 (for example, by running a circuitous route, rather than a straight route, to the proper ending point).

The trainer then orders the animal to accomplish whatever particular task the animal is currently learning to complete. Once the animal accomplishes the desired task, a signal is immediately transmitted by the transmitter to the receiver 18 of the animal behavior shaping device 10. When a signal from the transmitter is received by the receiver 18, the receiver 18 may trigger the release of the motivational item 68 as a reward or, if other accessories are used with the behavior shaping device 10, may trigger a different response, such as a noise, which acts as a mark for the animal's behavior. The immediate feedback provided to the animal through the use of the animal behavior shaping device 10 greatly increases the effectiveness of the training which the animal receives. That is, through the use of the present invention, the animal's behavior may be instantly and consistently marked or rewarded, resulting in increased speed and effectiveness of training, while relieving the trainer of the animal of the burden of physically providing the animal with the motivational item.

Briefly described, and in accordance with one embodiment of the present invention, the present invention provides a device for training an animal by accurately and consistently marking and rewarding desired behaviors, by relieving the burden of such marking and rewarding from the trainer. The current invention's capability includes both marking and rewarding behavior in a single system with long distance capabilities. Additionally, the present invention provides a device for training an animal that exhibits increased effectiveness due to the device's triggering or initiation of the animal's "prey drive" by propelling the motivational or reward item away from the device and, generally, away from the current location of the animal. This increased training effectiveness shortens the time required to train an animal and expands potential of training with positive stimulus techniques, while reducing the need for negative stimulus during training.

EXAMPLES OF THE USE OF THE PREFERRED EMBODIMENT(S) OF THE PRESENT INVENTION

The following are provided as illustrations of potential uses of an animal behavior shaping device embodying features of the present invention and should not be considered to illustrate the only uses of a device embodying features of the present invention. Rather, it should be clear to one skilled in art that a device embodying features of the present invention may be used as part of or incorporated in a wide variety of training methods, exercises, and courses used to train animals to perform certain desired tasks.

Example 1

A dog is being trained to run an agility course, which includes running through a tunnel and clearing a jump. A pressure sensing pad accessory coded to Channel 2 on the receiver and associated with a clicker accessory attached to the animal behavior shaping system is set at the end of the tunnel. A second pressure sensing pad accessory is set to Channel 1 and associated with the delivery of a motivational item is set at the back side of the final jump. The animal behavior shaping device is set up beyond the final jump and the second sensing pad and pointed away from the pad. The trainer runs with the animal and directs it through the tunnel. As dog clears the end of the tunnel, the dog steps on the first pressure sensing pad and the sensing pad transmits a signal to the animal behavior shaping device, which emits an instant click. The trainer then directs the dog over the final jump. The dog lands on the second pressure sensing pad, which transmits a signal to the animal behavior shaping device, which causes the release of the motivational item and propels it away from the dog, which initiates the dog's prey drive response at a very high level. Thus, the dog moves much faster, is more eager to work, and learns the desired behaviors more quickly.

Example 2

A schutzhund (protection) dog is being trained to complete the "send out" exercise, an exercise where the dog must run straight out from the handler for a distance of up to 100 meters, then must lay down on command and wait for handler to return to the dog. Because of distance involved, current training methods for this exercise generally involve leaving the reward on ground at the end of the field or course. This current method very commonly causes the dog to search for the reward if the dog was slightly off course, which may sets back training and creates confusion by delaying the delivery of the reward to the dog. With an animal behavior shaping device that embodies features of the present invention, the animal behavior shaping device may be set up in a concealed position at the end of the field and pointing away from the animal. A hand-held transmitter, or a pressure sensitive pad or motion detector, may be used to trigger the release of the motivational item. Due to the distance involved in this exercise and the preferred delivery of the reward from ground level, in some cases it may be necessary to use an additional long-range receiver accessory with the device or it may be necessary for an assistant to the dog handler located partially or fully down the course to trigger the device. The dog is sent out and commanded to run the exercise. To train the dog to quickly run the initial portion of the course, a transmitter may be used to release the motivational item when the dog comes within set range of the end of the course. For example a motion detector or pressure sensor may be used to release the motivational item. The dog immediately hears a solenoid click and sees the motivational item being propelled at high speed away from him, thus creating strong prey drive and faster, more accurate send outs, in a much shorter training time. Likewise, the hand-held transmitter or other transmitter may be used in conjunction with the training of the dog to lie down on command after the "send out" is complete. Namely, the hand-held transmitter may be used to release the motivational item once the dog reaches a given spot and remains in place until the handler returns to the dog.

While the invention has been described in the specification and illustrated in the drawings with reference to certain preferred embodiments, it will be understood by those skilled in the art that various changes may be made and equivalents may be substituted for elements thereof without departing from the scope of the present invention as defined in the appended claims. In addition, many modifications may be made to adapt a particular situation or material to the teachings of the invention, as defined in the appended claims, without departing from the essential scope thereof. Therefore, it is intended that the present invention not be limited to the particular embodiments illustrated by the drawings and described in the specification as the best modes presently contemplated for carrying out the present invention, but that the present invention will include any embodiments falling within the description of the appended claims.

What is claimed is:

1. An apparatus for shaping the behavior of an animal comprising:
   a bore assembly;
   a spring assembly;
   a trigger assembly; and
   an accessory;
   wherein the spring assembly is capable of propelling an object for training the animal from the bore assembly, wherein the spring assembly has a compressed configuration and an uncompressed configuration, wherein the energy that propels the object for training the animal from the bore assembly is transferred to the object for training the animal by direct contact with the spring assembly as the spring assembly shifts from its compressed configuration to its uncompressed configuration; and wherein the bore assembly includes at least one connector, the accessory includes at least one connector, the at least one connector of the bore assembly is a signal connector, and the at least one connector of the accessory is attached to the signal connector.

2. The apparatus of claim 1 wherein the trigger assembly engages the spring assembly when the spring assembly is in its compressed configuration, the operation of the trigger assembly disengages the trigger assembly from the spring assembly, thereby allowing the spring assembly to shift to its uncompressed configuration, and the accessory is capable of operating the trigger assembly by transmitting a signal through the signal connector.

3. The apparatus of claim 1 wherein the signal connector of the bore assembly is a mono phone jack connector.

4. An apparatus for shaping the behavior of an animal comprising:
   a bore assembly;
   a spring assembly;
   a trigger assembly;
   an accessory; and
   a rechargeable battery;
   wherein the spring assembly is capable of propelling an object for training the animal from the bore assembly, wherein the spring assembly has a compressed configuration and an uncompressed configuration, wherein the energy that propels the object for training the animal from the bore assembly is transferred to the object for training the animal by direct contact with the spring assembly as the spring assembly shifts from its compressed configuration to its uncompressed configuration; and wherein the bore assembly includes at least one connector and the at least one connector of the bore assembly is capable of receiving at least one connector from a power source to recharge the rechargeable battery.

5. The apparatus of claim 4 wherein the bore assembly includes at least one connector, the accessory includes at least one connector, the at least one connector of the bore assembly is a power connector, and wherein the at least one connector of the accessory is attached to the power connector to provide the accessory with power.

6. The apparatus of claim 5 wherein the power connector of the bore assembly is a direct current power jack connector.

7. The apparatus of claim 4 wherein the bore assembly includes at least two connectors and the at least two connectors of the bore assembly comprises at least one power connector and at least one signal connector.

8. The apparatus of claim 7 wherein the accessory includes at least one connector to connect the accessory to the at least one power connector of the bore assembly to provide the accessory with power, the accessory includes at least one connector to connect the accessory to the at least one signal connector of the bore assembly, the trigger assembly engages the spring assembly when the spring assembly is in the compressed configuration, the operation of the trigger assembly disengages the trigger assembly from the spring assembly, thereby allowing the spring assembly to shift to its uncompressed configuration, and the accessory is capable of operating the trigger assembly by transmitting a signal through the signal connector.

9. The apparatus of claim 8 wherein the accessory includes a motion detector.

10. The apparatus of claim 8 wherein the accessory is capable of producing a sound for marking the behavior of the animal.

11. The apparatus of claim 10 wherein the accessory includes a clicker solenoid.

12. The apparatus of claim 10 wherein the accessory includes a game caller.

13. The apparatus of claim 8 wherein the apparatus for shaping the behavior of an animal further comprises a long-range transmitter and the accessory includes a long-range receiver capable of receiving a signal from the long-range transmitter.

14. The apparatus of claim 4 further comprising a receiver for receiving a signal transmitted by a transmitter and wherein the accessory is a wireless accessory that includes the transmitter to transmit a signal to the receiver wherein the accessory includes a motion detector.

15. The apparatus of claim 4 further comprising a receiver for receiving a signal transmitted by a transmitter and wherein the accessory is a wireless accessory that includes the transmitter to transmit a signal to the receiver wherein the accessory includes a pressure sensing pad.

16. The apparatus of claim 4 further comprising a receiver for receiving a signal transmitted by a transmitter and wherein the accessory is a wireless accessory that includes the transmitter to transmit a signal to the receiver wherein the accessory includes a shock sensor.

* * * * *